United States Patent
Jo et al.

(10) Patent No.: US 11,614,888 B2
(45) Date of Patent: Mar. 28, 2023

(54) MEMORY SYSTEM AND ELECTRONIC SYSTEM INCLUDING THE SAME

(71) Applicant: SAMSUNG ELECTRONICS CO., LTD., Suwon-si (KR)

(72) Inventors: Byoung Kon Jo, Suwon-si (KR); Tae Young Lee, Seoul (KR); Song Won Kim, Seoul (KR); Joon Kun Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/462,224

(22) Filed: Aug. 31, 2021

(65) Prior Publication Data

US 2022/0188022 A1 Jun. 16, 2022

(30) Foreign Application Priority Data

Dec. 11, 2020 (KR) .................... 10-2020-0173388

(51) Int. Cl.
*G06F 3/06* (2006.01)
*G06F 13/16* (2006.01)

(52) U.S. Cl.
CPC .......... *G06F 3/0658* (2013.01); *G06F 3/0611* (2013.01); *G06F 3/0673* (2013.01); *G06F 13/1689* (2013.01)

(58) Field of Classification Search
CPC .... G06F 3/0658; G06F 3/0673; G06F 3/0611; G06F 3/0659; G06F 3/0604; G06F 13/1689
See application file for complete search history.

(56) References Cited

U.S. PATENT DOCUMENTS

| | | | |
|---|---|---|---|
| 9,026,725 B2 | 5/2015 | Kostinsky et al. |
| 9,607,714 B2 | 3/2017 | Malladi et al. |
| 9,851,744 B2 | 12/2017 | Dearth et al. |
| 10,621,121 B2 | 4/2020 | Lovelace et al. |

(Continued)

FOREIGN PATENT DOCUMENTS

| | | |
|---|---|---|
| KR | 10-1382985 | 4/2014 |
| KR | 10-1678413 | 11/2016 |
| KR | 10-1752583 | 7/2017 |

*Primary Examiner* — Ernest Unelus
(74) *Attorney, Agent, or Firm* — F. Chau & Associates, LLC

(57) ABSTRACT

A memory system includes a memory controller configured to control an operation of a memory cell array through a first command/address pin and a second other command/address pin and a memory device. The memory device includes a plurality of data pins configured to exchange data input with the memory cell array according to a command/address provided through the first and second command/address pins to the memory controller, a first flip-flop to sample a first command/address signal provided through the first command/address pin as first command/address data at a first time, and a second flip-flop to sample a second command/address signal provided through the second command/address pin as second command/address data at the first time. The memory device provides the first and second command/address data to the memory controller through a first data pin among the plurality of data pins.

18 Claims, 20 Drawing Sheets

(56) References Cited

U.S. PATENT DOCUMENTS

| | | |
|---|---|---|
| 2020/0110716 A1 | 4/2020 | Mozak et al. |
| 2020/0126609 A1* | 4/2020 | Kim et al. |
| 2020/0143865 A1* | 5/2020 | Alzheimer .......... G11C 11/4091 |
| 2022/0148645 A1* | 5/2022 | Meier ............... G11C 11/40611 |

* cited by examiner

FIG. 5

| CA_CLK<br>DQ[0:3] | CA_CLK0 | CA_CLK1 | CA_CLK2 | CA_CLK3 |
|---|---|---|---|---|
| DQ[0] | C/A_D[0] | C/A_D[1] | C/A_D[2] | C/A_D[3] |
| DQ[1] | C/A_D[4] | C/A_D[5] | C/A_D[6] | C/A_D[7] |
| DQ[2] | C/A_D[8] | C/A_D[9] | C/A_D[10] | C/A_D[11] |
| DQ[3] | C/A_D[12] | C/A_D[13] | RFU | T_Result |

T_MT1

202_4 ~ 202_15 : OFF
DQ[4:15] : Invalid

FIG. 17

| CA_CLK<br>DQ[0:3] | CA_CLK0 | CA_CLK1 |
|---|---|---|
| DQ[0] | XORc0<br>C/A_D[0:1] | XORc1<br>C/A_D[2:3] |
| DQ[1] | XORc2<br>C/A_D[4:5] | XORc3<br>C/A_D[6:7] |
| DQ[2] | XORc4<br>C/A_D[8:9] | XORc5<br>C/A_D[10:11] |
| DQ[3] | XORc6<br>C/A_D[12:13] | T_Result |

T_MT3

202_4 ~ 202_15 : OFF
DQ[4:15] : Invalid

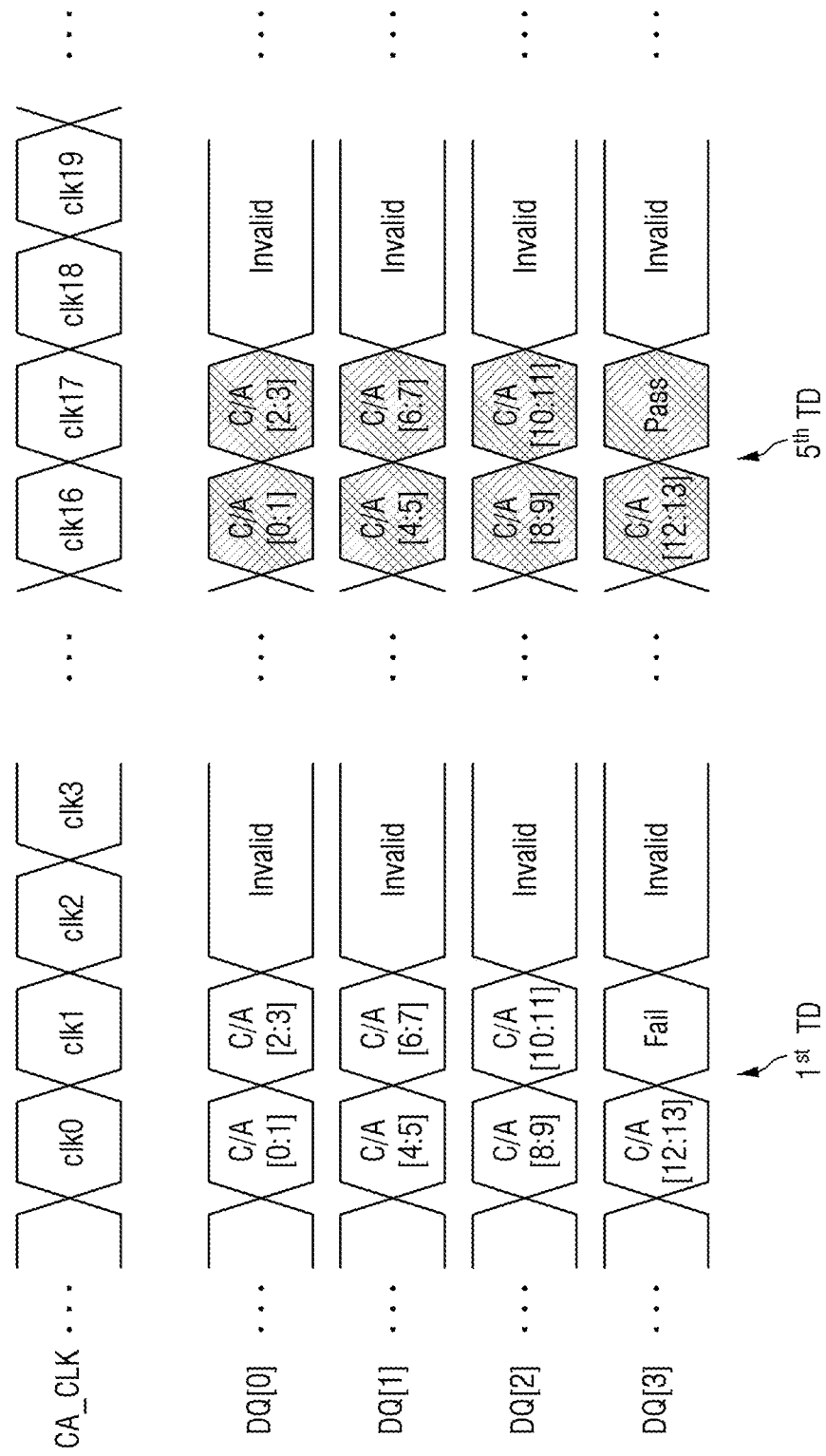

MEMORY SYSTEM AND ELECTRONIC SYSTEM INCLUDING THE SAME

CROSS-REFERENCE TO RELATED APPLICATION

This U.S non-provisional patent application claims priority under 35 U.S.C. § 119 to Korean Patent Application No. 10-2020-0173388 filed on Dec. 11, 2020 in the Korean Intellectual Property Office, the disclosure of which is incorporated by reference in its entirety herein.

1. Technical Field

The present disclosure relates to a memory system and an electronic system including the same.

2. Discussion of Related Art

A memory controller performs a process of synchronizing a clock signal with data exchanged through a data bus in a memory system before performing an operation of on a memory device of the memory system. The memory controller performs a training method for synchronizing the data with the clock signal such as adjusting the transmission timing of the data.

A phase difference occurs over time between the data and the clock signal due to changes in voltage and temperature of the memory controller and changes in operating voltage and operating temperature of the memory device.

However, current training methods for compensating for the phase difference between the data and the clock signal use a large amount of power and reduce performance of the memory system.

SUMMARY

At least one embodiment of the present disclosure provides a memory system with improved power efficiency when performing a training operation.

At least one embodiment of the present disclosure provides an electronic system with improved power efficiency when performing a training operation.

At least one embodiment of the present disclosure provides a memory system with increased training performance speed.

At least one embodiment of the present disclosure provides an electronic system with increased training performance speed.

According to an exemplary embodiment of the inventive concept, there is provided a memory system including a memory controller and a memory device. The memory controller is configured to control an operation of a memory cell array through a first command/address pin and a second other command/address pin. The memory device includes a plurality of data pins configured to exchange data input with the memory cell array according to a command/address provided through the first and second command/address pins to the memory controller, a first flip-flop to sample a first command/address signal provided through the first command/address pin as first command/address data at a first time, and a second flip-flop to sample a second command/address signal provided through the second command/address pin as second command/address data at the first time. The memory device provides the first and second command/address data to the memory controller through a first data pin among the plurality of data pins.

According to an exemplary embodiment of the inventive concept, there is provided a memory system including a memory controller and a memory device. The memory controller is configured to control operation of a memory cell array by providing a command/address through a first command/address pin and a second other command/address pin, perform training on a first command/address signal transmitted through the first command/address pin based on a first time, and perform training on a second command/address signal transmitted through the second command/address pin based on the first time. The memory device is configured to receive the trained first and second command/address signals and include a plurality of data pins which output first command/address data and second command/address data respectively corresponding to the first and second command/address signals. The memory device outputs the first and second command/address data through a first data pin among the plurality of data pins.

According to an exemplary embodiment of the inventive concept, there is provided an electronic system including a host, a memory controller, and a memory device. The host is configured to provide a command for requesting an input or output of data. The memory controller is configured to control an operation of a memory cell array by providing a command/address through a first command/address pin and a second other command/address pin. The memory device includes a plurality of data pins which provide the data of the memory cell array input or output through the command/address to the memory controller. The memory device further includes a first flip-flop configured to sample a first command/address signal provided through the first command/address pin, as first command/address data at a first time and a second flip-flop configured to sample a second command/address signal provided through the second first command/address pin, as second command/address data at the first time. The first and second command/address data are provided to the memory controller through a first data pin among the plurality of data pins.

According to an exemplary embodiment of the inventive concept, there is provided a memory system including a memory controller and a memory device. The memory controller includes a plurality of first command/address pins, a plurality of first data pins, and a first clock pin for outputting a clock signal. The memory device includes a plurality of second command/address pins connected to the first command/address pins, a plurality of second data pins connected to the first data pins, and a second clock pin connected to the first clock pin. The memory controller is configured to output a training command and training data across the first command/address pins to the memory device in response to receiving an operation command from a host. The memory device is configured to generate sampling results including the training data and a training result indicating whether the training data is out of sync with the clock signal received at the second clock, and output the sampling results across only some of the second data pins, in response to receiving the training command. The memory controller is configured to send the operation command to the memory device when the training result of the received sampling indicates the training data is not out of sync with the clock signal.

BRIEF DESCRIPTION OF THE DRAWINGS

The present disclosure will become more apparent by describing exemplary embodiments thereof in detail with reference to the attached drawings, in which:

FIG. 5 is a diagram illustrating a mapping table of the command/address training MUX of FIG. 4;

FIG. 17 is a diagram illustrating a mapping table of the command/address training MUX of FIG. 16;

FIG. 20 is a diagram illustrating outputs of command/address data of FIG. 18.

DETAILED DESCRIPTION OF THE EMBODIMENTS

Figure 1:
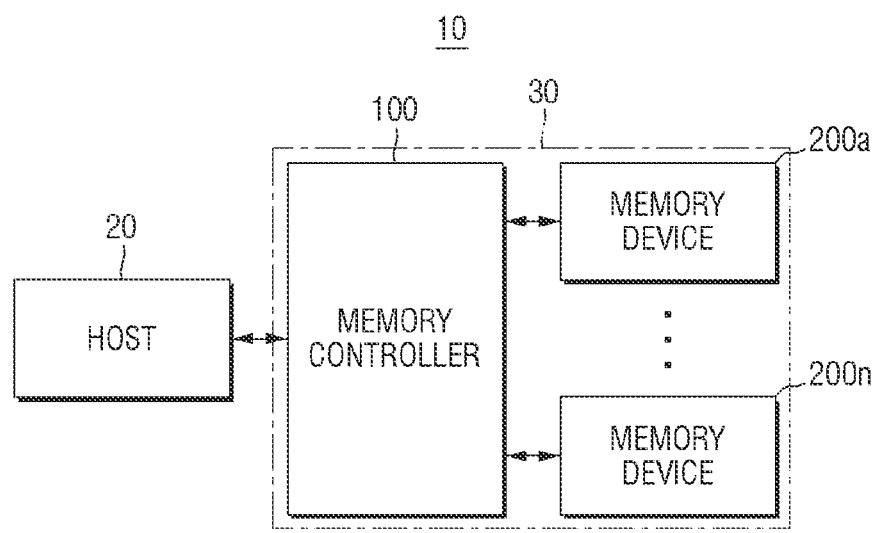
FIG. 1 is a block diagram illustrating an electronic system according to an exemplary embodiment of the present disclosure.

Hereinafter, exemplary embodiments of the present disclosure will be described with reference to the accompanying drawings. In the descriptions of FIGS. 1 to 20, the same reference numerals will be used for substantially the same elements, and overlapping description of the same elements will be omitted. Throughout the drawings of the present disclosure, like elements are indicated by like reference numerals.

FIG. 1 is a block diagram illustrating an electronic system 10 according to an exemplary embodiment of the present disclosure.

Referring to FIG. 1, the electronic system 10 includes a host 20 and a memory system 30. The memory system 30 includes a memory controller 100 and a plurality of memory devices 200a to 200n.

The host 20 may communicate with the memory system 30 using an interface protocol such as peripheral component interconnect-express (PCI-E), advanced technology attachment (ATA), serial ATA (SATA), parallel ATA (PATA), or serial attached small computer system interface (SAS). Also, interface protocols between the host 20 and the memory system 30 are not limited to these examples and may be one of other interface protocols such as universal serial bus (USB), multi-media card (MMC), enhanced small disk interface (ESDI), and integrated drive electronics (IDE).

The memory controller 100 controls the overall operation of the memory system 30 and controls data exchanged between the host 20 and the memory devices 200a to 200n. For example, the memory controller 100 writes or reads data by controlling the memory devices 200a to 200n according to a request from the host 20.

Also, the memory controller 100 controls operations of the memory devices 200a to 200n by applying an operation command for controlling the memory devices 200a to 200n.

According to exemplary embodiments, each of the memory devices 200a to 200n may be a dynamic random access memory (DRAM), such as a double data rate (DDR) synchronous dynamic random access memory (SDRAM), a low power double data rate (LPDDR) SDRAM, a graphics double data rate (GDDR) SDRAM, and a Rambus dynamic random access memory (RDRAM). In one particular embodiment, a protocol such as DDR5 is applied in each of the memory devices 200a to 200n.

According to an exemplary embodiment, 14 command/address pins 101 and 201 to which the DDR5 protocol applies may be disposed, and the number of data pins 102 and 202 may be four, eight, or sixteen.

The number of the command/address pins 101 and 201 and the number of data pins 102 and 202 used in the memory system 30 may comply with a protocol for a DRAM but embodiments of the inventive concept are not limited thereto.

Figure 2:
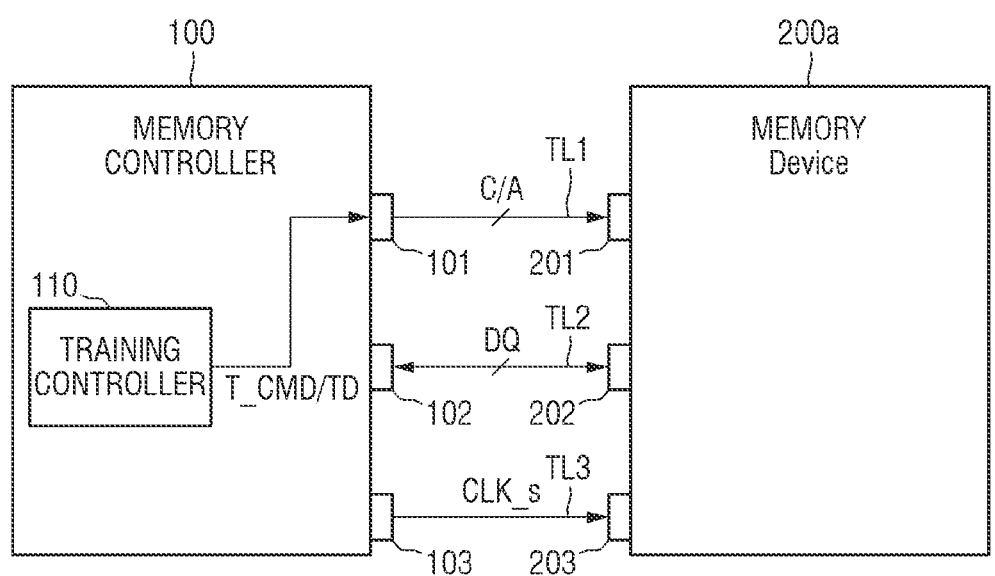
FIG. 2 is a block diagram illustrating a memory system according to an exemplary embodiments of the present disclosure.

FIG. 2 is a block diagram illustrating a memory system according to an exemplary embodiment of the present disclosure.

In FIG. 2, only a single memory device 200a corresponding to the memory controller 100 will be described as an example for ease of discussion. However, the inventive concept is not limited to a single memory device 200a since multiple memory devices 200a may be present. Referring to FIG. 2, the memory system 30 includes the memory controller 100 and the memory device 200a.

The memory controller 100 includes a training controller 110 (e.g., a control circuit). The training controller 110 may perform a timing training process on the memory device 200a before an operation command of the memory device 200a is executed and may adjust transmission timings of a plurality of command/address signals C/A so that a system clock signal CLK_s and a command/address signal C/A may be synchronized with each other. The training controller 110 may transmit a training command T_CMD to the memory device 200a through the command/address pins 101 and 201 when starting a training operation of the memory device 200a and may transmit training data TD, of which transmission timing has been adjusted, to the memory device 200a through the command/address pins 101 and 201 at regular intervals during training.

The memory controller 100 and the memory device 200a may be connected to each other through the corresponding command/address pins 101 and 201, the corresponding data pins 102 and 202, and corresponding clock pins 103 and 203. The memory controller 100 includes the command/address pins 101, data pins 102, and clock pins 103 and the memory device 200a includes the command/address pins 201, data pins 202, and clock pins 203. The command/address pins 101 and 201 may transmit the command/address signal C/A through a command transmission line TL1, the data pins 102 and 202 may exchange data DQ through a data transmission line TL2, and the clock pins 103 and 203 may transmit the system clock signal CLK_s through a clock transmission line TL3.

Referring to FIGS. 1 and 2, on the basis of a request from the host 20, the memory controller 100 may input a command (CMD)/address (ADDR) to the memory device 200a through the command/address pins 101 and 201 and input data to the memory device 200a or output data from the memory device 200a through the data pins 102 and 202. Also, the memory controller 100 may input a clock signal (e.g., CLK_s) of the memory system 30 to the memory device 200a through the clock pins 103 and 203.

Figure 3:
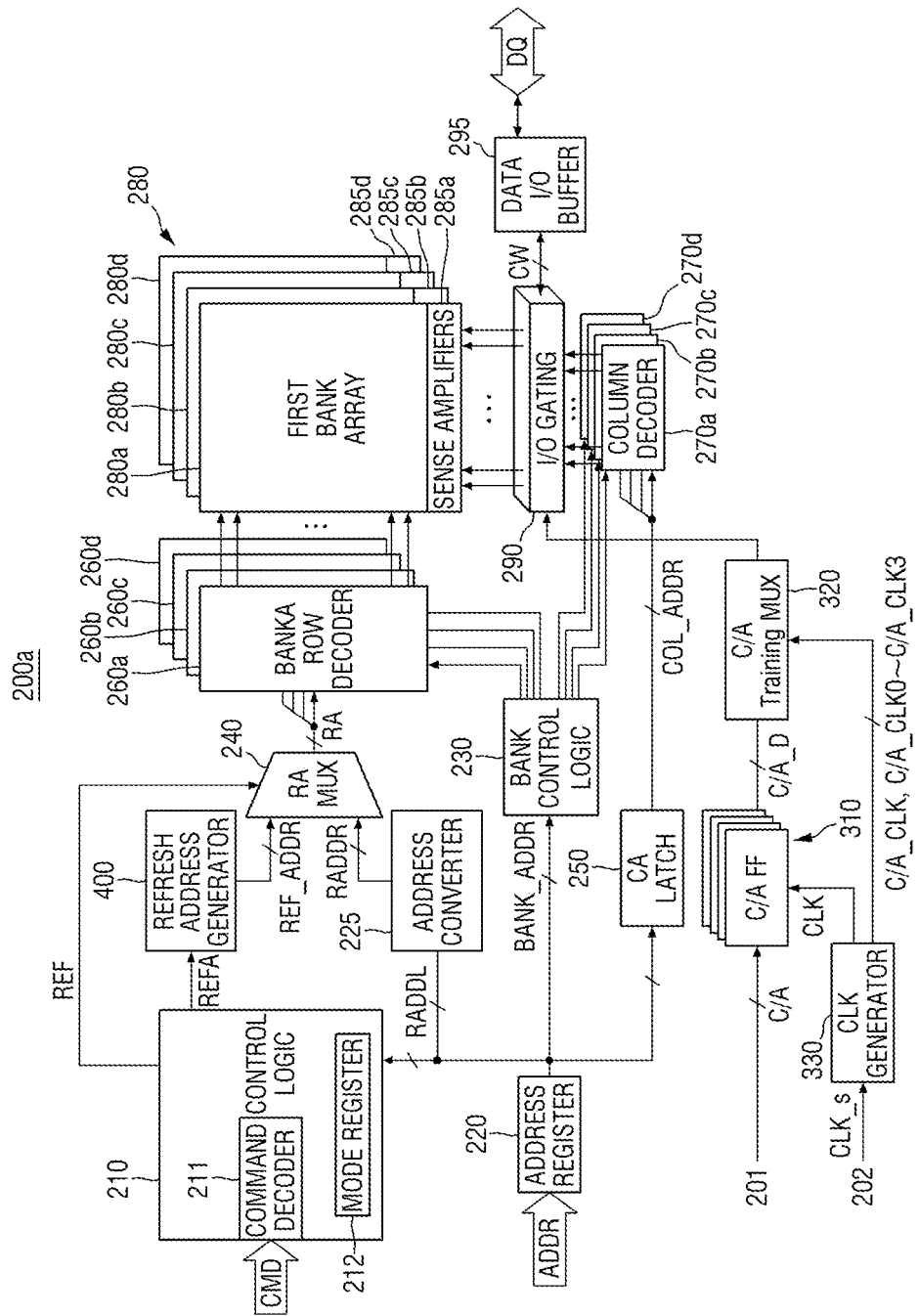
FIG. 3 is a block diagram illustrating a memory device according to an exemplary embodiment of the present disclosure.
Figure 4:
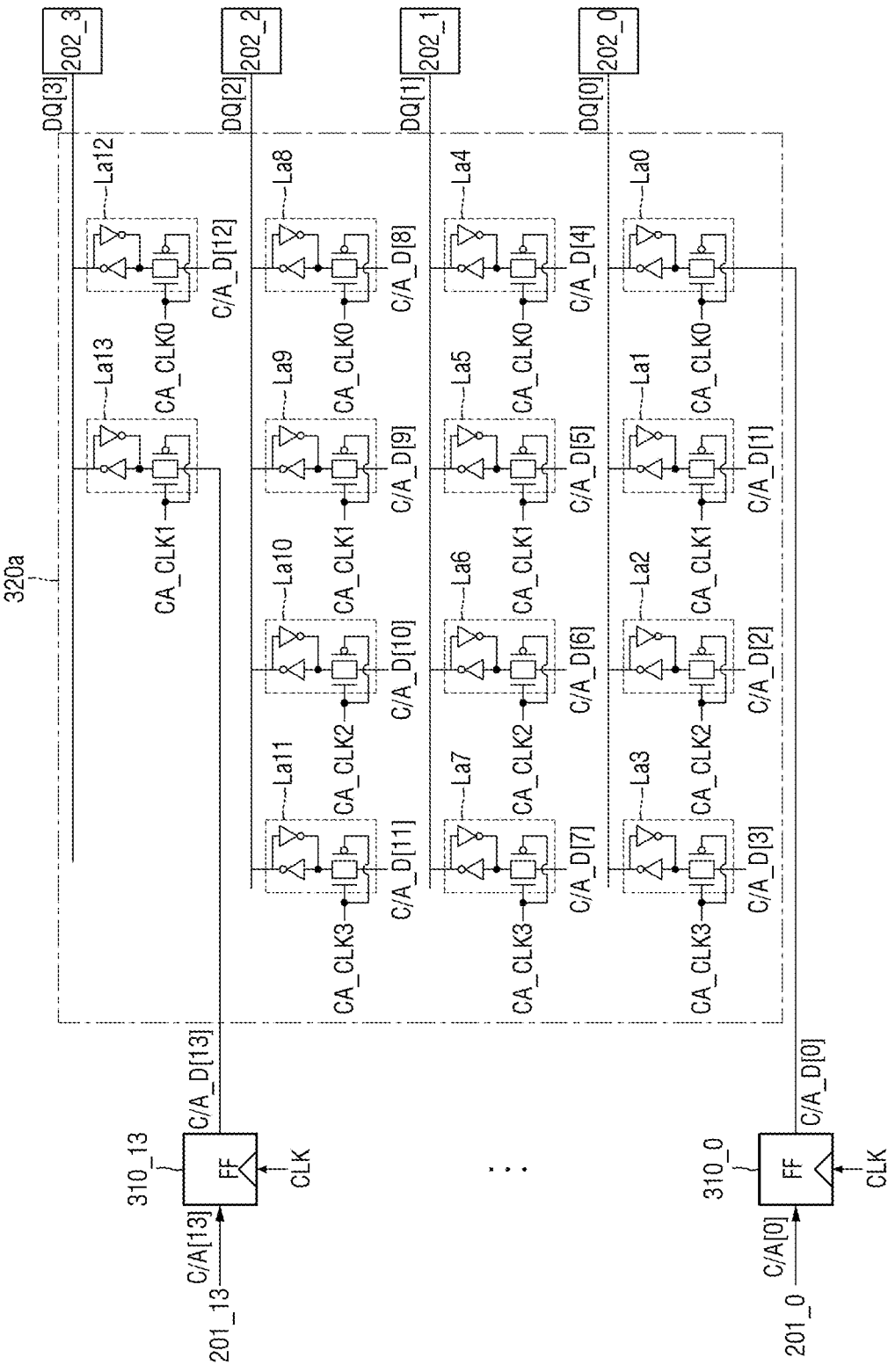
FIG. 4 is a diagram illustrating a command/address training multiplexer (MUX) according to an exemplary embodiment of the present disclosure.

FIG. 3 is a block diagram illustrating a memory device according to an exemplary embodiment of the present disclosure. FIG. 4 is a diagram illustrating a command/address training multiplexer (MUX) according to an exemplary embodiment of the present disclosure.

Referring to FIG. 3, the memory device 200a includes a controller 210 (e.g., a logic circuit), an address register 220, a bank control logic 230 (e.g., a logic circuit), a row address (RA) MUX 240, a column address (CA) latch 250, a row decoder (e.g., a decoder circuit), a column decoder (e.g., a decoder circuit), a memory cell array 280, a sense amplifier part, an input/output gating circuit 290, a data input/output buffer 295, an address conversion circuit 225, a plurality of command/address flip-flops 310, a command/address training MUX 320, a clock generator 330, and a refresh control circuit 400.

The memory cell array 280 may include first to fourth bank arrays 280a, 280b, 280c, and 280d. Each of the first to fourth bank arrays 280a, 280b, 280c, and 280d may be divided into a plurality of memory blocks.

Each of the plurality of memory blocks may include a plurality of pages. For example, one page may include one memory cell row.

The row decoder may include first to fourth bank row decoders 260a, 260b, 260c, and 260d respectively connected to the first to fourth bank arrays 280a, 280b, 280c, and 280d. The column decoder may include first to fourth bank column decoders 270a, 270b, 270c, and 270d respectively connected to the first to fourth bank arrays 280a, 280b, 280c, and 280d. The sense amplifier part may include first to fourth bank sense amplifiers 285a, 285b, 285c, and 285d respectively connected to the first to fourth bank arrays 280a, 280b, 280c, and 280d.

The first to fourth bank arrays 280a, 280b, 280c, and 280d, the first to fourth bank sense amplifiers 285a, 285b, 285c, and 285d, the first to fourth bank row decoders 260a, 260b, 260c, and 260d, and the first to fourth bank column decoders 270a, 270b, 270c, and 270d may constitute first to fourth banks, respectively. FIG. 3 shows an example of the memory device 200a including four banks, but the memory device 200a may include an arbitrary number of banks according to embodiments.

The controller 210 may control the operation of the memory device 200a. For example, the controller 210 may generate control signals so that the memory device 200a may perform an input or output operation such as a write operation or a read operation. The controller 210 may include a command decoder 211 which decodes an operation command CMD received from the memory controller 100 and a mode register 212 for setting an operating mode of the memory device 200a. For example, the command decoder 211 may generate the control signals corresponding to the operation command CMD by decoding a write enable signal /WE, an RA strobe signal /RAS, a chip selection signal /CS, and the like. Also, the controller 210 may further receive a clock signal CLK and a clock enable signal /CKE from the clock generator 330 to operate the memory device 200a in a synchronized manner.

The address register 220 may receive an address signal ADDR including a bank address BANK_ADDR, a logical row address RADDL, and a column address COL_ADDR from the memory controller 100. The address register 220 may provide the received bank address BANK_ADDR to the bank control logic 230, provide the received logical row address RADDL to the address conversion circuit 225, and provide the received column address COL_ADDR to the CA latch 250.

The address conversion circuit 225 converts the received logical row address RADDL into a physical row address RADDR for designating each of the memory cell rows in the memory cell array 280 and provides the physical row address RADDR to the RA MUX 240. To convert the logical row address RADDL into the physical row address RADDR, the address conversion circuit 225 may include an address mapping table in which a logical row address RADDL of each of the memory cell rows in the memory cell array 280 is stored in connection with a physical row address RADDR.

The bank control logic 230 may generate bank control signals in response to the bank address BANK_ADDR. In response to the bank control signals, a bank row decoder corresponding to the bank address BANK_ADDR may be activated among the first to fourth bank row decoders 260a, 260b, 260c, and 260d, and a bank column decoder corresponding to the bank address BANK_ADDR may be activated among the first to fourth bank column decoders 270a, 270b, 270c, and 270d.

The RA MUX 240 may receive the physical row address RADDR from the address conversion circuit 225 and receive a refresh row address REF_ADDR from the refresh control circuit 400. The RA MUX 240 may selectively output the physical row address RADDP or the refresh row address REF_ADDR according to a refresh signal REF. The refresh signal REF may be generated on the basis of an auto refresh command provided by the memory controller 100 or may be internally generated in a self-refresh mode of the memory device 200a.

The RA output from the RA MUX 240 may be applied to each of the first to fourth bank row decoders 260a, 260b, 260c, and 260d.

Among the first to fourth bank row decoders 260a, 260b, 260c, and 260d, a bank row decoder activated by the bank control logic 230 may decode the RA output from the RA MUX 240 and activate a word line corresponding to the RA. For example, the activated bank RA may apply a word line driving voltage to a word line corresponding to the RA.

The CA latch 250 may receive the column address COL_ADDR from the address register 220 and temporarily store the received column address COL_ADDR. Also, the CA latch 250 may gradually increase the received column address COL_ADDR in a burst mode. The CA latch 250 may apply the column address COL_ADDR, which has been temporarily stored or gradually increased, to each of the first to fourth bank column decoders 270a, 270b, 270c, and 270d.

Among the first to fourth bank column decoders 270a, 270b, 270c, and 270d, a bank column decoder activated by the bank control logic 230 may activate a sense amplifier corresponding to the bank address BANK_ADDR and the column address COL_ADDR through the input/output gating circuit 290.

Together with circuits for gating input or output data, the input/output gating circuit 290 may include an input data mask logic, read data latches for storing data output from the first to fourth bank arrays 280a, 280b, 280c, and 280d, and write drivers for writing data to the first to fourth bank arrays 280a, 280b, 280c, and 280d.

Data DQ to be read from one of the first to fourth bank arrays 280a, 280b, 280c, and 280d may be sensed by the sense amplifier corresponding to the bank array and stored in the read data latches. The data DQ stored in the read data latches may be provided to the memory controller 100 through the data input/output buffer 295. Data DQ to be written to one of the first to fourth bank arrays 280a, 280b, 280c, and 280d may be provided from the memory controller 100 to the data input/output buffer 295. The data DQ provided to the data input/output buffer 295 may be written to the bank array through the write drivers.

Referring to FIGS. 3 and 4, the plurality of command/address flip-flops 310 include zeroth to thirteenth command/address flip-flops 310_0 to 310_13. While the command/address flip-flops 310 of FIG. 3 are illustrated as including fourteen flip-flops 310_0 to 310_13 in FIG. 4, the inventive concept is not limited to any number of flip-flops. Thus, less than fourteen or more than fourteen flip-flops may be present in alternate embodiments.

The zeroth to thirteenth command/address flip-flops 310_0 to 310_13 are respectively connected to zeroth to thirteenth command/address pins 201_0 to 201_13 included in the command/address pin 201, respectively receive zeroth to thirteenth command/address signals C/A[0:13], and generate zeroth to thirteenth command/address data C/A_D[0:13] by respectively sampling the zeroth to thirteenth command/address signals C/A[0:13] in synchronization with the clock signal CLK provided by the clock generator 330. For example, the memory device 200a stores a signal received at each of its command/address pins using a separate flip-flop, and then reads from the flip-flops in response to the clock signal CLK to perform the sampling.

The zeroth to thirteenth command/address flip-flops 310_0 to 310_13 provide the generated zeroth to thirteenth command/address data C/A_D[0:13] to a command/address training MUX 320a. The command/address training MUX 320a of FIG. 4 may be used to implement the command/address training MUX 320 of FIG. 3.

The command/address training MUX 320a may include zeroth to thirteenth latches La0 to La13. The command/address training MUX 320a may be connected to the input/output gating circuit 290 and output the data DQ to the data pin 202 through the input/output gating circuit 290.

The zeroth to thirteenth latches La0 to La13 respectively receive the zeroth to thirteenth command/address data C/A_D[0:13], and each of the zeroth to thirteenth latches La0 to La13 receives one of zeroth to third command/address clock signals CA_CLK0 to CA_CLK3 provided by the clock generator 330.

The zeroth latch La0, the fourth latch La4, the eighth latch La8, and the twelfth latch La12 respectively receive and output the zero$^{th}$ command/address data C/A_D[0], the fourth command/address data C/A_D[4], the eighth command/address data C/A_D[8], and the twelfth command/address data C/A_D[12] as zeroth to third data DQ[0:3] to zeroth to third data pins 202_0 to 202_3 in synchronization with the zero$^{th}$ command/address clock signal CA_CLK0.

The first latch La1, the fifth latch La5, the ninth latch La9, and the thirteen latch La13 respectively receive and output the first command/address data C/A_D[1], the fifth command/address data C/A_D[5], the ninth command/address data C/A_D[9], and the thirteenth command/address data C/A_D[13] as the zeroth to third data DQ[0:3] to the zeroth to third data pins 202_0 to 202_3 in synchronization with the first command/address clock signal CA_CLK1.

The second latch La2, the sixth latch La6, and the tenth latch La10 respectively receive and output the second command/address data C/A_D[2], the sixth command/address data C/A_D[6], and the tenth command/address data C/A_D[10] as the zeroth to third data DQ[0:3] to the zeroth to third data pins 202_0 to 202_3 in synchronization with the second command/address clock signal CA_CLK2.

The third latch La3, the seventh latch La1, and the eleventh latch La11 respectively receive and output the third command/address data C/A_D[3], the seventh command/address data C/A_D[7], and the eleventh command/address data C/A_D[11] as the zeroth to third data DQ[0:3] to the zeroth to third data pins 202_0 to 202_3 in synchronization with the third command/address clock signal CA_CLK3.

In the drawing, the zeroth to thirteenth latches La0 to La13 have a structure including one transmission gate and two inverters. While, the zeroth to thirteenth latches La0 to La13 are enabled by the zeroth to third command/address clock signals CA_CLK0 to CA_CLK3 to respectively output the zeroth to thirteenth command/address data C/A_D[0:13], embodiments of the present disclosure are not limited to the structure shown in FIG. 4.

The clock generator 330 receives the system clock signal CLK_s from the clock pin 203 and generates a clock signal CLK, a command/address clock signal CA_CLK, and zeroth to third command/address clock signals CA_CLK0 to CA_CLK3 on the basis of the system clock signal CLK_s. In an embodiment, the clock signal CLK is generated on the basis of the system clock signal CLK_s and a complementary clock signal CLK_c (see FIG. 8) and has a frequency which is double the frequency of the system clock signal CLK_s.

The clock signal CLK is provided to the plurality of command/address flip-flops 310 (C/A FF), and the command/address clock signal CA_CLK and the zeroth to third command/address clock signals CA_CLK0 to CA_CLK3 are provided to the command/address training MUX 320.

FIG. 5 is a diagram illustrating a mapping table T_MT1 of the command/address training MUX 320a of FIG. 4. FIG. 5 shows mapping relationships between command/address clock signals CA_CLK and zeroth to thirteenth command/address data C/A_D[0:13] output as data DQ.

In the command/address training MUX 320a, in synchronization with the zeroth command/address clock signal CA_CLK0, the zeroth command/address data[0] is output as the zeroth data DQ[0], the fourth command/address data[4] is output as the first data DQ[1], the eighth command/address data[8] is output as the second data DQ[2], and the twelfth command/address data[12] is output as the third data DQ[3].

In the command/address training MUX 320a, in synchronization with the first command/address clock signal CA_CLK1, the first command/address data[1] is output as the zeroth data DQ[0], the fifth command/address data[5] is output as the first data DQ[1], the ninth command/address data[9] is output as the second data DQ[2], and the thirteenth command/address data[13] is output as the third data DQ[3].

In the command/address training MUX 320a, in synchronization with the second command/address clock signal CA_CLK2, the second command/address data[2] is output as the zeroth data DQ[0], the sixth command/address data[6] is output as the first data DQ[1], the tenth command/address data[10] is output as the second data DQ[2], and reserved for future use (RFU) data is output as the third data DQ[3]. In an embodiment, the reserved for future use (RFU) data has a pre-defined state that differs from a state of normal data so it can be differentiated from the normal data.

In the command/address training MUX 320a, in synchronization with the third command/address clock signal CA_CLK3, the third command/address data[3] is output as the zeroth data DQ[0], the seventh command/address data[7] is output as the first data DQ[1], the eleventh command/address data[11] is output as the second data DQ[2], and training result data T_Result representing a training result of a "pass" or a "fail" is output as the third data DQ[3]. Although not illustrated, for example, the command/address training MUX 320a includes logic that outputs training result data T_Result compared to command/address data C/A_D corresponding the training data TD following and predetermined data to store. For example, the training result data may indicate whether the system clock signal CLK_s is considered to be sufficiently in sync with data exchanged along a data transmission line TL2.

During the training operation, the remaining fourth to fifteenth data pins 202_4 to 202_15 are turned off and do not perform an output operation, and fourth to fifteenth data DQ[4:15] output from the fourth to fifteenth data pins 202_4 to 202_15 are invalid.

Figure 6:
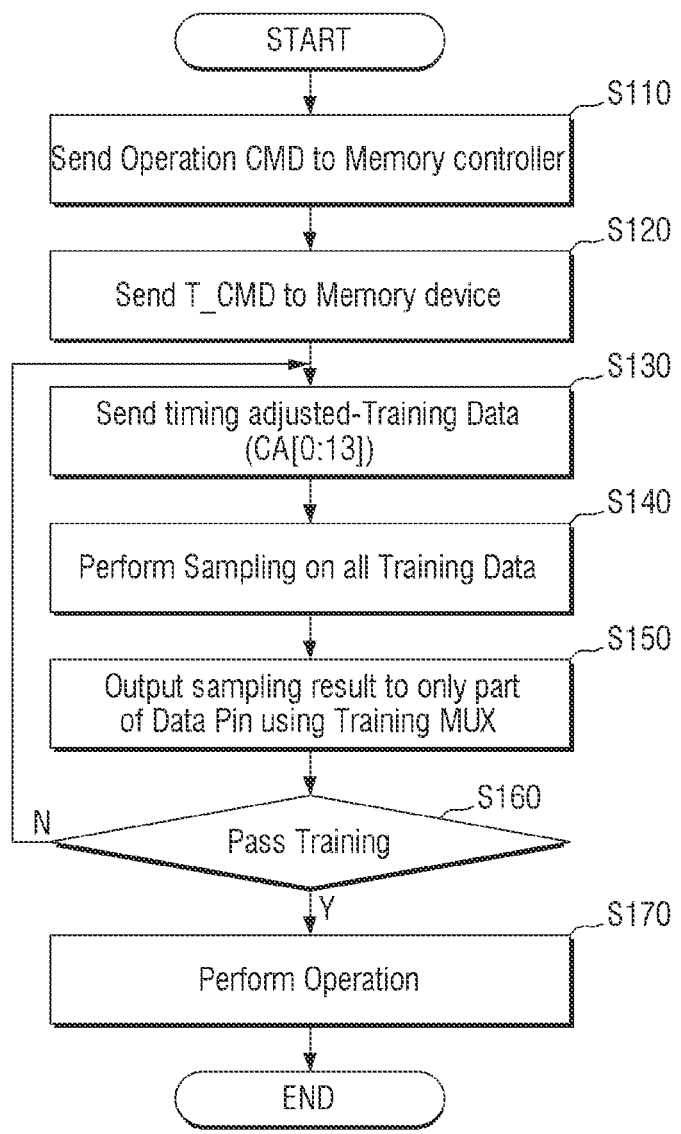
FIG. 6 is a flowchart illustrating an operation of the electronic system according to an exemplary embodiment of the present disclosure.
Figure 7:
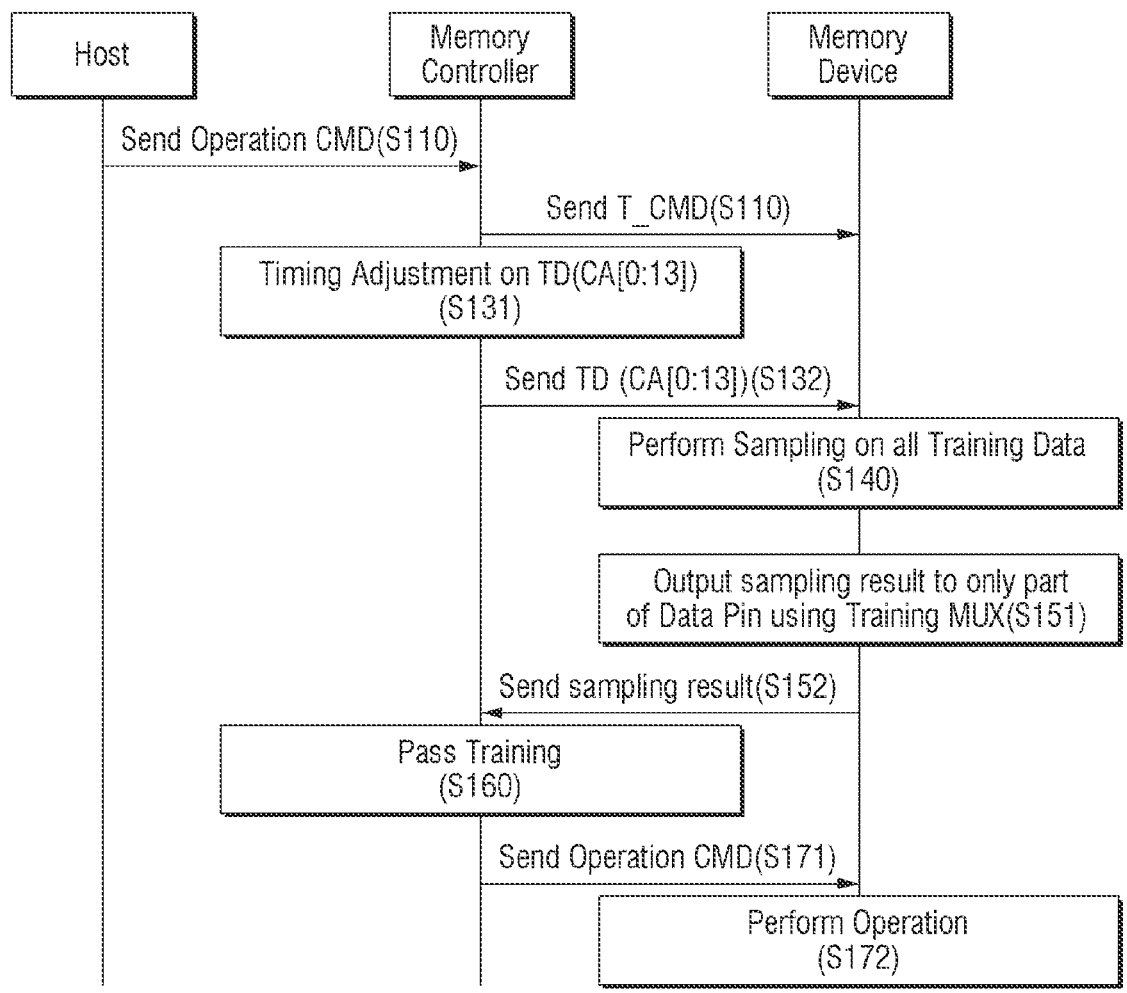
FIG. 7 is a ladder diagram illustrating an operation of the electronic system according to an exemplary embodiment of the present disclosure.
Figure 8:
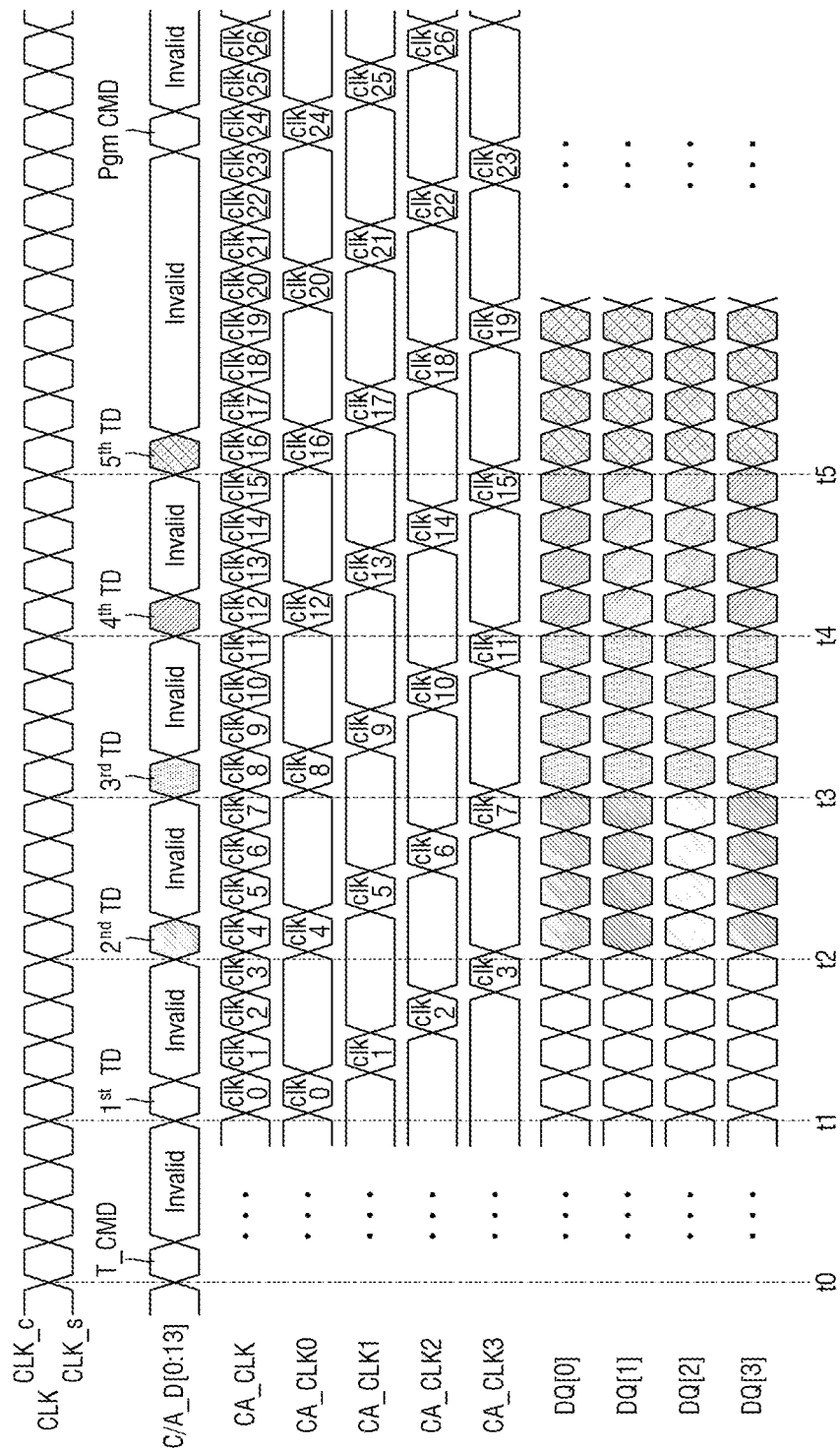
FIG. 8 is a timing diagram illustrating an operation of a memory system including the command/address training MUX of FIG. 4 according to an exemplary embodiment of the present disclosure.
Figure 9:
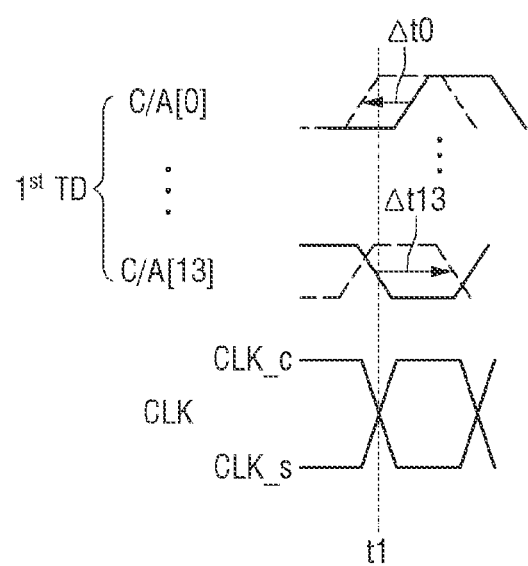
FIG. 9 is a diagram illustrating training data of FIG. 8.
Figure 10:
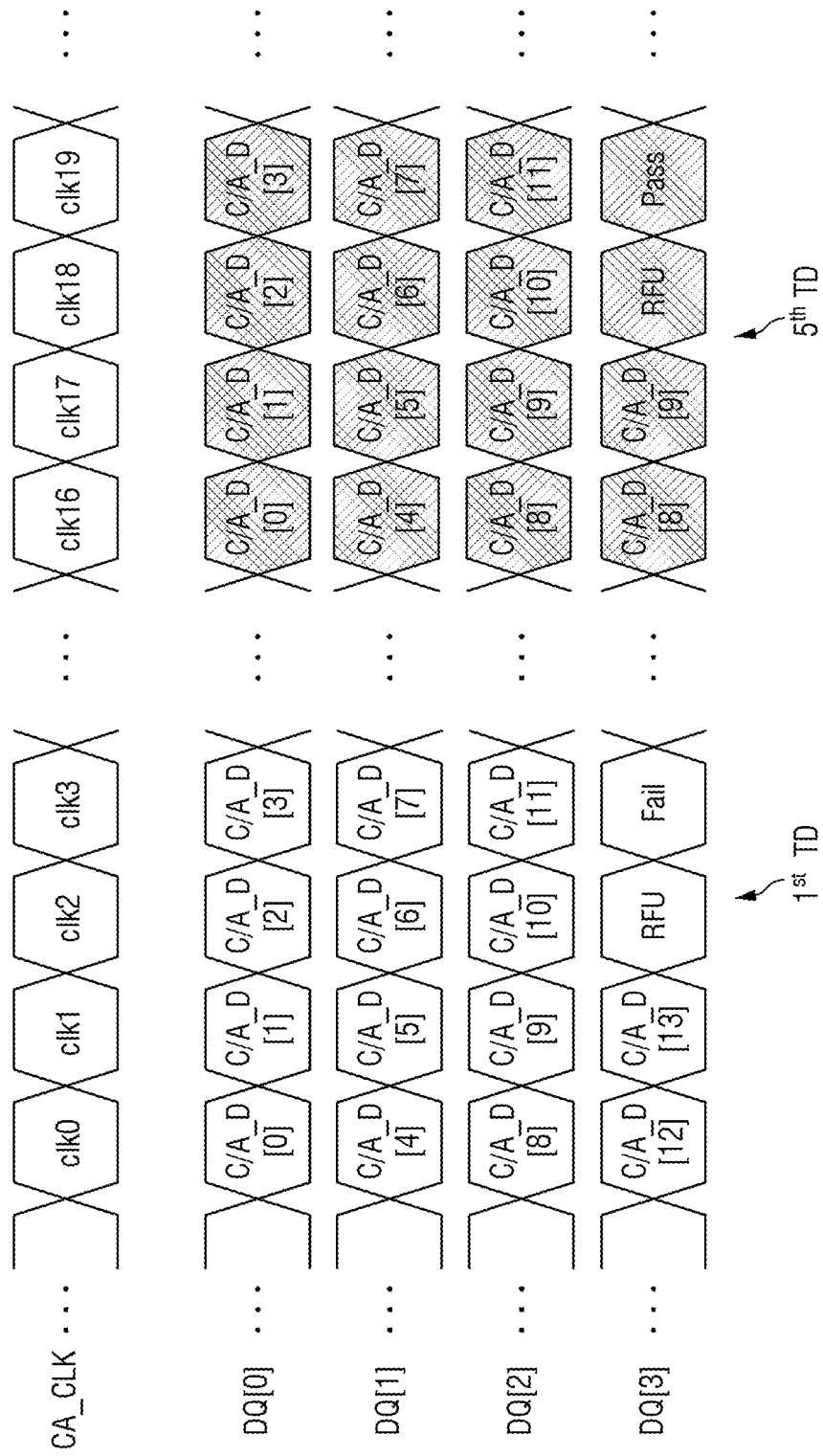
FIG. 10 is a diagram illustrating outputs of command/address data of FIG. 8.

FIG. 6 is a flowchart illustrating an operation of an electronic system according to an exemplary embodiment of the present disclosure. FIG. 7 is a ladder diagram illustrating the operation of the electronic system according to an exemplary embodiment of the present disclosure. FIG. 8 is a timing diagram illustrating an operation of a memory system including the command/address training MUX of FIG. 4. FIG. 9 is a diagram illustrating training data of FIG. 8. FIG. 10 is a diagram illustrating outputs of command/address data of FIG. 8.

Referring to FIGS. 6 to 8, the host 20 controls the operation of the memory device 200a by providing an operation command CMD to the memory controller 100 (S110).

After receiving the operation command CMD (S110), the memory controller 100 provides a training command T_CMD to the memory device 200a (S120). The training controller 110 in the memory controller 100 provides zeroth to thirteenth command/address signals C/A[0:13] corresponding to the training command T_CMD to the memory device 200a (S120). For example, in the memory device 200a of the present invention, the training command T_CMD can be provided simultaneously in the plurality of command/address flip-flops 310 and the controller 210.

The plurality of command/address flip-flops 310 sample the zeroth to thirteenth command/address signals C/A[0:13] corresponding to the training command T_CMD at a zeroth time t0 in synchronization with a clock signal CLK and output zeroth to thirteenth command/address data C/A_D[0:13] corresponding to the training command T_CMD as zeroth to third data DQ[0:3]. In an exemplary embodiment, the plurality of command/address flip-flops 310 sample the zeroth to thirteenth command/address signals C/A[0:13] corresponding to the training command T_CMD in response to the controller 210 receiving the training command T_CMD.

The memory controller 100 transmits all training data TD to be transmitted as the timing-adjusted zeroth to thirteenth command/address signals C/A[0:13] to the memory device 200a (S130).

The memory controller 100 performs timing adjustment training on all the training data TD to be transmitted as the zeroth to thirteenth command/address signals C/A[0:13] (S131).

Additionally referring to FIG. 9, the plurality of command/address flip-flops 310 sample the zeroth to thirteenth command/address signals C/A[0:13] corresponding to first training data $1^{st}$ TD at a first time t1 as zeroth to thirteenth command/address data C/A_D[0:13] and output zeroth to thirteenth command/address data C/A_D[0:13] corresponding to training command T_CMD as the zeroth to third data DQ[0:3].

In an embodiment, the memory controller 100 performs the training so that timings of zeroth to thirteenth command/address signals C/A[0:13] included in the first training data $1^{st}$ TD is adjusted on the basis of the first time t1 at the zeroth to thirteenth command/address flip-flops 310_0 to 310_13, respectively (S131). Then, the memory controller 100 provides the first training data $1^{st}$ TD to the memory device 200a (S132).

The zeroth to thirteenth command/address flip-flops 310_0 to 310_13 sample the zeroth to thirteenth command/address signals C/A[0:13] trained at the first time t1 as zeroth to thirteenth command/address data C/A_D[0:13] in synchronization with the clock signal CLK (S140). The sampled zeroth to thirteenth command/address data C/A_D[0:13] may be referred to as sampling results.

The memory device 200a outputs the sampling results using only a part of the data pins 201 through the command/address training MUX 320a (S150). For example, if there are 16 data pins present, the memory device 200a could output the sampling results through 4 of the 16 pins and not output any of the sampling results through the remaining 12 pins.

The zeroth to thirteenth command/address data C/A_D[0:13] which corresponds to the sampling results may be output in synchronization with zeroth to third command/address clock signals CA_CLK0 to CA_CLK3.

The zeroth to third command/address clock signals CA_CLK0 to CA_CLK3 are generated on the basis of a command/address clock signal CA_CLK.

The command/address clock signal CA_CLK includes consecutive zeroth to twenty-sixth clock signals CLK0 to CLK26 which have the same frequency as the clock signal CLK on the basis of a system clock signal CLK_s.

The zeroth command/address clock signal CA_CLK0 includes a zeroth clock signal clk0, a fourth clock signal clk4, an eighth clock signal clk8, a twelfth clock signal clk12, a sixteenth clock signal clk16, a twentieth clock signal clk20, and twenty-fourth clock signal clk24 and does not include other signals. In other words, the zeroth command/address clock signal CA_CLK0 includes four-cycle signals on the basis of the zeroth clock signal clk0 in the command/address clock signal CA_CLK.

The first command/address clock signal CA_CLK1 includes a first clock signal clk1, a fifth clock signal clk5, a ninth clock signal clk9, a thirteenth clock signal clk13, a seventeenth clock signal clk17, a twenty-first clock signal clk21, and twenty-fifth clock signal clk25 and does not include other signals. In other words, the first command/ address clock signal CA_CLK1 includes four-cycle signals on the basis of the first clock signal clk1 in the command/address clock signal CA_CLK.

The second command/address clock signal CA_CLK2 includes a second clock signal clk2, a sixth clock signal clk6, a tenth clock signal clk10, a fourteenth clock signal clk14, a eighteenth clock signal clk18, a twenty-second clock signal clk22, and twenty-sixth clock signal clk26 and does not include other signals. In other words, the second command/address clock signal CA_CLK2 includes four-cycle signals on the basis of the second clock signal clk2 in the command/address clock signal CA_CLK.

The third command/address clock signal CA_CLK3 includes a third clock signal clk3, a seventh clock signal clk7, an eleventh clock signal clk11, a fifteenth clock signal clk15, a nineteenth clock signal clk19, and a twenty-third clock signal clk23 and does not include other signals. In other words, the third command/address clock signal CA_CLK3 includes four-cycle signals on the basis of the third clock signal clk3 in the command/address clock signal CA_CLK.

Referring to FIG. 10, the command/address training MUX 320a respectively outputs the zeroth command/address data C/A_D[0], the fourth command/address data C/A_D[4], the eighth command/address data C/A_D[8], and the twelfth command/address data C/A_D[12] included in the first training data $1^{st}$ TD to the zeroth to third data pins 202_0 to 202_3 as the zeroth to third data DQ[0:3] in synchronization with the zeroth clock signal clk0 (S151) and provides the outputs to the memory controller 100 (S152).

The command/address training MUX 320a respectively outputs the first command/address data C/A_D[1], the fifth command/address data C/A_D[5], the ninth command/address data C/A_D[9], and the thirteenth command/address data C/A_D[13] included in the first training data $1^{st}$ TD to the zeroth to third data pins 202_0 to 202_3 as the zeroth to third data DQ[0:3] in synchronization with the first clock signal clk1 (S151) and provides the outputs to the memory controller 100 (S152).

The command/address training MUX 320a respectively outputs the second command/address data C/A_D[2], the sixth command/address data C/A_D[6], the tenth command/address data C/A_D[10], and RFU data included in the first training data $1^{st}$ TD to the zeroth to third data pins 202_0 to 202_3 as the zeroth to third data DQ[0:3] in synchronization with the second clock signal clk2 (S151) and provides the outputs to the memory controller 100 (S152).

The command/address training MUX 320a respectively outputs the third command/address data C/A_D[3], the seventh command/address data C/A_D[7], the eleventh command/address data C/A_D[11], and training result data T_Result, which represents a "fail," included in the first training data $1^{st}$ TD to the zeroth to third data pins 202_0 to 202_3 as the zeroth to third data DQ[0:3] in synchronization with the third clock signal clk3 (S151) and provides the outputs to the memory controller 100 (S152). For example, the memory device 200a may set the training result data T_Result to a "fail" to indicate that the clock signal CLK_s is considered not sufficiently in sync with data signals provided by the memory controller 100 through the second transmission line TL2.

The memory controller 100 completes the training on the basis of the training result data T_Result (S160). The memory controller 100 receives the training result data T_Result, which corresponds to the first training data $1^{st}$ TD and represents a "fail," and repeats the operations S130 to S160 (N).

Second to fifth times t2 to t5 subsequent to the first time t1 correspond to the first time t1, and second to fifth training data $2^{nd}$ TD to $5^{th}$ TD provided subsequent to the first training data $1^{st}$ TD corresponds to the first training data $1^{st}$ TD.

Also, all zeroth command/address clock signals CA_CLK0 subsequent to the zeroth clock signal clk0 correspond to the zeroth clock signal clk0, all first command/address clock signals CA_CLK1 subsequent to the first clock signal clk1 correspond to the first clock signal clk1, all second command/address clocks signal CA_CLK2 subsequent to the second clock signal clk2 correspond to the second clock signal clk2, and all third command/address clock signals CA_CLK3 subsequent to the third clock signal clk3 correspond to the third clock signal clk3.

Therefore, it is self-evident that a training operation for the second to fifth training data $2^{nd}$ TD to $5^{th}$ TD is replaced with that for the first training data $1^{st}$ TD. However, a training result data T_Result which is output from the fifth training data $5^{th}$ TD in synchronization with the nineteenth clock signal clk19 represents a "pass."

When the training result data T_Result represents a "pass," the training result data T_Result denotes that all the zeroth to thirteenth command/address signals C/A[0:13] provided to the memory device 200a as the fifth training data $5^{th}$ TD are synchronized with the clock signal CLK. Accordingly, the training operation is a "pass."

When the memory controller 100 receives the training result data T_Result representing a "pass," the memory controller 100 provides an operation command CMD for an input or output operation including a write operation, a read operation, or the like to the memory device 200a (S170).

The memory controller 100 provides the operation command CMD as command/address signals CA[0:13] through the command/address pins 101 and 201 (S171). The memory device 200a performs an operation according to the operation command CMD (S172).

While performing a training operation, the memory system 30 including the command/address training MUX 320a according to an exemplary embodiment of the present disclosure performs an output operation through only some data pins and does not perform an output operation through other data pins to improve power efficiency of the training operation. In other words, in an exemplary embodiment, the memory system 30 performs an output operation through only the zeroth to third data pins 202_0 to 202_3 and does not perform an output operation through the remaining fourth to fifteenth data pins 202_4 to 202_15 by turning off the remaining fourth to fifteenth data pins 202_4 to 202_15 to improve power efficiency of the training operation.

In the memory system 30 including the command/address training MUX 320a according to an exemplary embodiment of the present disclosure, the memory controller 100 performs a timing adjustment on a plurality of command/address signals at one time to generate results and outputs the results through a plurality of data pins to improve speed efficiency of the training operation. In other words, according to an exemplary embodiment, the memory system 30 performs a training operation of timing adjustment on the zeroth to thirteenth command/address signals C/A[0:13] at the first time t1 and outputs sampling results of the training operation through the zeroth to third data pins 202_0 to 202_3 to improve speed efficiency of the training operation.

Figure 11:
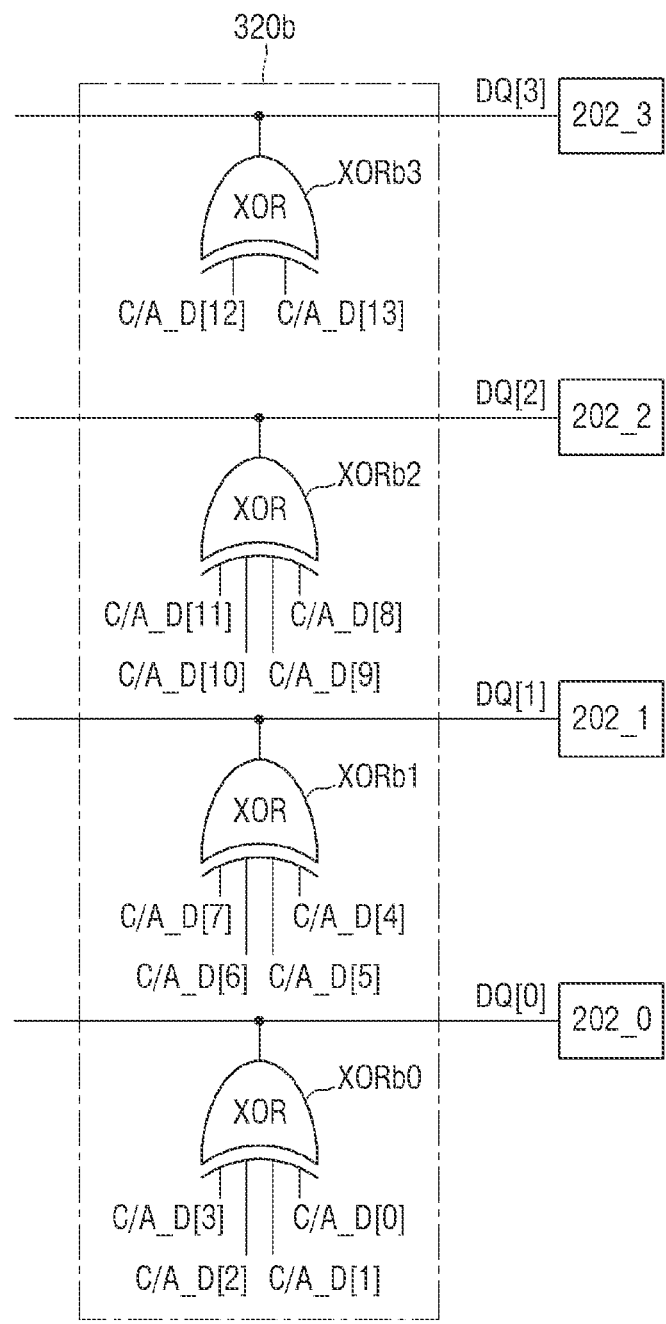
FIG. 11 is a diagram illustrating a command/address training MUX according to an exemplary embodiment of the present disclosure.
Figure 12:
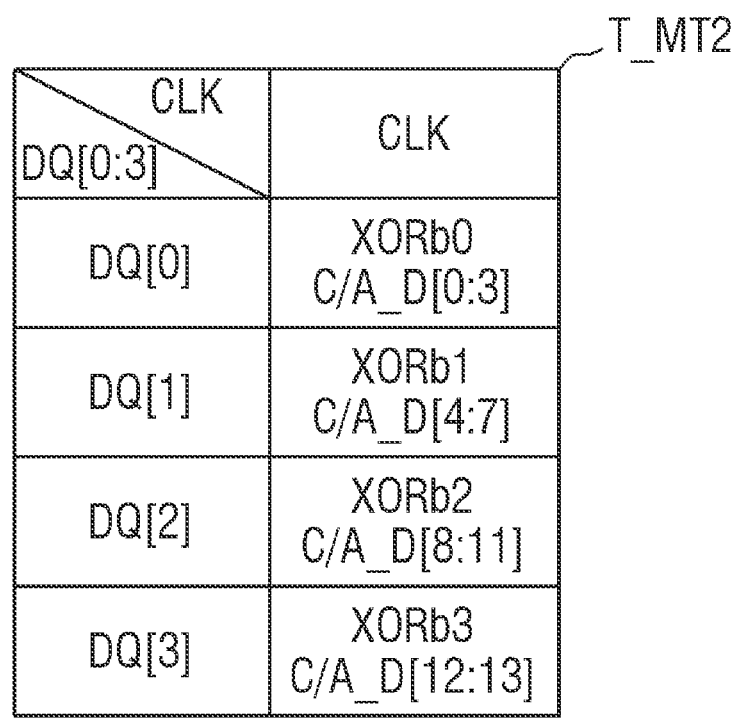
FIG. 12 is a diagram illustrating a mapping table of the command/address training MUX of FIG. 11.

FIG. 11 is a diagram illustrating a command/address training MUX 320b according to an exemplary embodiment of the present disclosure. FIG. 12 is a diagram illustrating a mapping table T_MT2 of the command/address training MUX 320b of FIG. 11. The command/address training MUX 320b may be used to implement the command/address training MUX 320 of FIG. 3.

A memory system according to an exemplary embodiment of the present disclosure will be described below with reference to FIGS. 11 and 12. Differences from the memory system shown in FIGS. 1 to 5 will be mainly described.

The command/address training MUX 320b according to this exemplary embodiment includes zeroth to third XOR operators XORb0 to XORb3 (e.g., logic circuits or gates).

The zeroth XOR operator XORb0 receives zeroth to third command/address data C/A_D[0:3] and outputs an XOR operation result for the zeroth to third command/address data C/A_D[0:3] as zeroth data DQ[0] by providing the XOR operation result to the zeroth data pin 202_0.

The first XOR operator XORb1 receives fourth to seventh command/address data C/A_D[4:7] and outputs an XOR operation result for the fourth to seventh command/address data C/A_D[4:7] as first data DQ[1] by providing the XOR operation result to the first data pin 202_1.

The second XOR operator XORb2 receives eight to eleventh command/address data C/A_D[8:11] and outputs an XOR operation result for the eighth to eleventh command/address data C/A_D[8:11] as second data DQ[2] by providing the XOR operation result to the second data pin 202_2.

The third XOR operator XORb3 receives twelfth and thirteenth command/address data C/A_D[12:13] and outputs an XOR operation result for the twelfth and thirteenth command/address data C/A_D[12:13] as third data DQ[3] by providing the XOR operation result to the third data pin 202_3.

FIG. 12 shows mapping relationships between a clock signal CLK and zeroth to thirteenth command/address data C/A_D[0:13] output as data DQ. The clock signal CLK corresponds to the clock signal CLK of FIG. 8.

Referring to FIG. 12, from the command/address training MUX 320b, the XOR operation result for the zeroth to third command/address data C/A_D[0:3] is output to the zeroth data pin 202_0, the XOR operation result for the fourth to seventh command/address data C/A_D[4:7] is output to the first data pin 202_1, the XOR operation result for the eighth to eleventh command/address data C/A_D[8:11] is output to the second data pin 202_2, and the XOR operation result for the twelfth and thirteenth command/address data C/A_D[12:13] is output to the third data pin 202_3 in synchronization with the clock signal.

During the training operation, the remaining fourth to fifteenth data pins 202_4 to 202_15 are turned off and do not perform an output operation, and fourth to fifteenth data DQ[4:15] output from the fourth to fifteenth data pins 202_4 to 202_15 are invalid.

Figure 13:
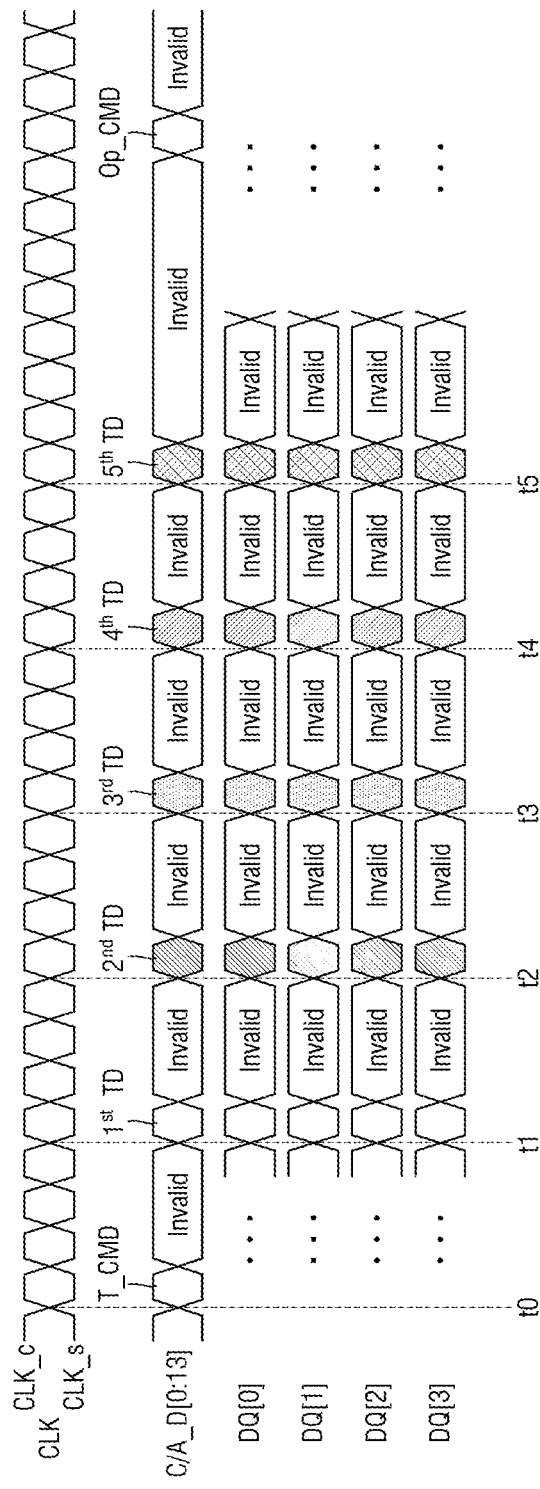
FIG. 13 is a timing diagram illustrating an operation of a memory system including the command/address training MUX of FIG. 11 according to an exemplary embodiment of the present disclosure.
Figure 14:
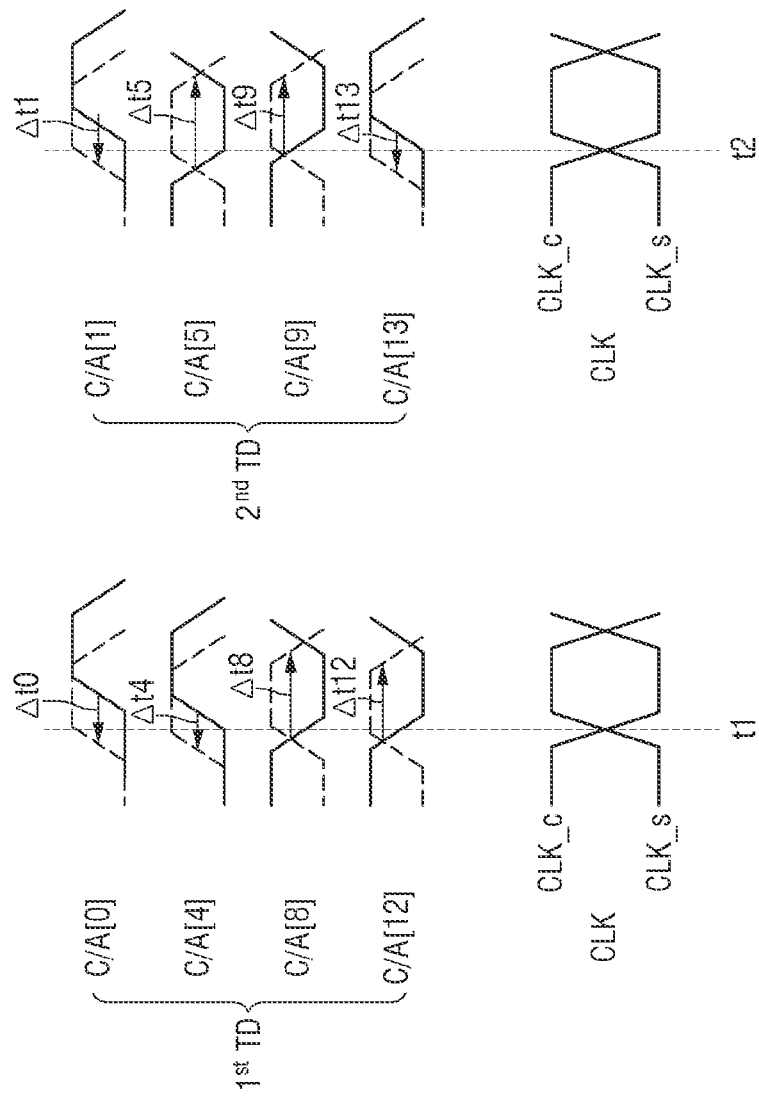
FIG. 14 is a diagram illustrating training data of FIG. 13.
Figure 15:
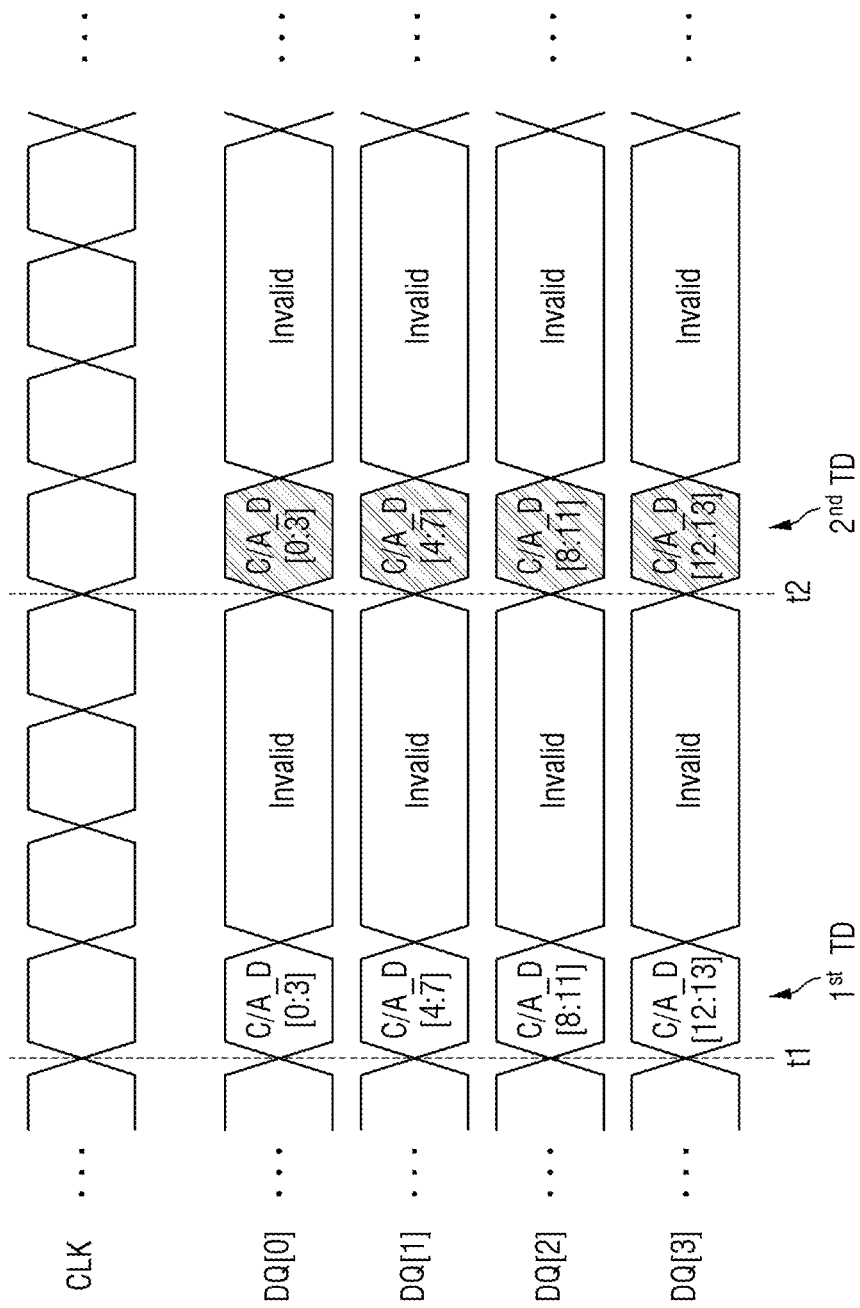
FIG. 15 is a diagram illustrating outputs of command/address data of FIG. 13.

FIG. 13 is a timing diagram illustrating the operation of a memory system including the command/address training MUX of FIG. 11. FIG. 14 is a diagram illustrating training data of FIG. 13. FIG. 15 is a diagram illustrating outputs of command/address data of FIG. 13.

Referring to FIGS. 13 to 15, a plurality of command/address flip-flops 310 sample zeroth to thirteenth command/address signals C/A[0:13] corresponding to a training command T_CMD at a zeroth time t0 in synchronization with the clock signal CLK and output the zeroth to thirteenth command/address data C/A_D[0:13] corresponding to the training command T_CMD as zeroth to third data DQ[0:3].

In the memory system including the command/address training MUX 320b, a memory controller 100 performs timing adjustment training on some of the zeroth to thirteenth command/address signals C/A[0:13] included in first training data $1^{st}$ TD.

The memory controller 100 performs timing adjustments $\Delta t0$, $\Delta t4$, $\Delta t8$, and $\Delta t12$ on only the zeroth command/address signal C/A[0], the fourth command/address signal C/A[4], the eighth command/address signal C/A[8], and the twelfth command/address signal C/A[12] on the basis of a first time t1. The memory controller 100 performs timing adjustment on only the zeroth command/address signal C/A[0], the fourth command/address signal C/A[4], the eighth command/address signal C/A[8], and the twelfth command/address signal C/A[12] and determines whether the training operation for the zeroth command/address signal C/A[0], the fourth command/address signal C/A[4], the eighth command/address signal C/A[8], and the twelfth command/address signal C/A[12] has been finished through an XOR operation result.

At the first time t1, an XOR operation result value of the zeroth to third command/address signals C/A[0:3] of the first training data $1^{st}$ TD is output as the zeroth data DQ[0] through the zeroth data pin 202_0, an XOR operation result value of the fourth to seventh command/address signals C/A[4:7] of the first training data $1^{st}$ TD is output as the first data DQ[1] through the first data pin 202_1, an XOR operation result value of the eighth to eleventh command/address signals C/A[8:11] of the first training data $1^{st}$ TD is output as the second data DQ[2] through the second data pin 202_2, and an XOR operation result value of the twelfth and thirteenth command/address signals C/A[12:13] of the first training data $1^{st}$ TD is output as the third data DQ[3] through the third data pin 202_3.

The memory controller 100 performs timing adjustments $\Delta t1$, $\Delta t5$, $\Delta t9$, and $\Delta t13$ on a first command/address signal C/A[1], a fifth command/address signal C/A[5], a ninth command/address signal C/A[9], and a thirteenth command/address signal C/A[13] among zeroth to thirteenth command/address signals C/A[0:13] included in second training data $2^{nd}$ TD on the basis of a second time t2 subsequent to the first time t1.

At the second time t2, an XOR operation result value of the zeroth to third command/address signals C/A[0:3] of the second training data $2^{nd}$ TD is output as the zeroth data DQ[0] through the zeroth data pin 202_0, an XOR operation result value of the fourth to seventh command/address signals C/A[4:7] of the second training data $2^{nd}$ TD is output as the first data DQ[1] through the first data pin 202_1, an XOR operation result value of the eighth to eleventh command/address signals C/A[8:11] of the second training data $2^{nd}$ TD is output as the second data DQ[2] through the second data pin 202_2, and an XOR operation result value of the twelfth and thirteenth command/address signals C/A[12:13] of the second training data $2^{nd}$ TD is output as the third data DQ[3] through the third data pin 202_3.

On the basis of a third time t3 subsequent to the second time t2, the memory controller 100 performs a timing adjustment on a second command/address signal C/A[2], a sixth command/address signal C/A[6], and a tenth command/address signal C/A[10] among zeroth to thirteenth command/address signals C/A[0:13] included in third training data $3^{rd}$ TD.

On the basis of a fourth time t4 subsequent to the third time t3, the memory controller 100 performs a timing adjustment on a third command/address signal C/A[3], a seventh command/address signal C/A[7], and a eleventh command/address signal C/A[11] among zeroth to thirteenth command/address signals C/A[0:13] included in fourth training data $4^{th}$ TD.

Compared with the command/address training MUX 320a, the command/address training MUX 320b does not include latches and thus does not map RFU data to the zeroth to third data DQ[0:3]. Accordingly, the memory controller 100 directly determines a "pass" or a "fail" of training for zeroth to thirteenth command/address signals C/A[0:13]. The memory controller 100 determines a training result for fifth training data $5^{th}$ TD to be a "pass."

The command/address training MUX 320b only includes the XOR operators (e.g., logic circuits or gates) and thus may output training information of the zeroth to thirteenth command/address signals C/A[0:13] in synchronization with a clock signal of one cycle. In addition, the command/address training MUX 320b may reduce the period of timing adjustment for the zeroth to thirteenth command/address signals C/A[0:13] to one cycle.

Figure 16:
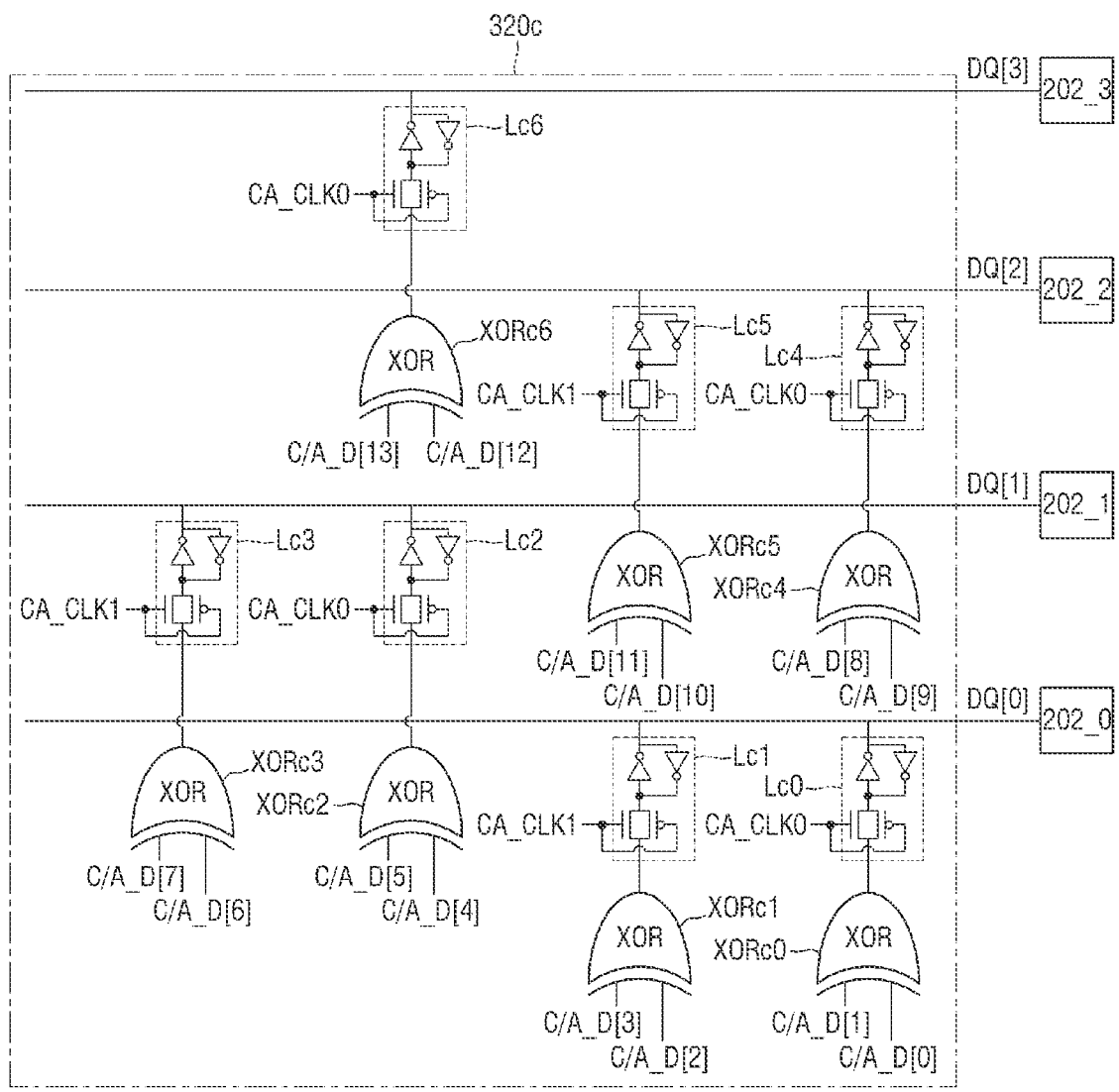
FIG. 16 is a diagram illustrating a command/address training MUX according to an exemplary embodiment of the present disclosure.

FIG. 16 is a diagram illustrating a command/address training MUX 320c according to an exemplary embodiment of the present disclosure. FIG. 17 is a diagram illustrating a mapping table T_MT3 of the command/address training MUX 320c of FIG. 16.

A memory system according to an exemplary embodiment of the present disclosure will be described below with reference to FIGS. 16 and 17. Differences from the memory system shown in FIGS. 1 to 5 will be mainly described.

The command/address training MUX 320c according to an exemplary embodiment includes zeroth to sixth XOR operators XORc0 to XORc6 and zeroth to sixth latches Lc0 to Lc6. The command/address training MUX 320 of FIG. 3 may be implemented using the command/address training MUX 320c.

The zeroth XOR operator XORc0 receives zeroth and first command/address data C/A_D[0:1] and provides an XOR operation result for the zeroth and first command/address data C/A_D[0:1] to the zeroth latch Lc0. The zeroth latch Lc0 outputs the XOR operation result for the zeroth and first command/address data C/A_D[0:1] as zeroth data DQ[0] in synchronization with a zeroth command/address clock signal CA_CLK0.

The first XOR operator XORc1 receives second and third command/address data C/A_D[2:3] and provides an XOR operation result for the second and third command/address data C/A_D[2:3] to the first latch Lc1. The first latch Lc1 outputs the XOR operation result for the second and third command/address data C/A_D[2:3] as the zeroth data DQ[0] in synchronization with a first command/address clock signal CA_CLK1.

The zeroth command/address clock signal CA_CLK0 and the first command/address clock signal CA_CLK1 correspond to the zeroth command/address clock signal CA_CLK0 and the first command/address clock signal CA_CLK1 of FIG. 8.

The second XOR operator XORc2 receives fourth and fifth command/address data C/A_D[4:5] and provides an XOR operation result for the fourth and fifth command/address data C/A_D[4:5] to the second latch Lc2. The second latch Lc2 outputs the XOR operation result for the fourth and fifth command/address data C/A_D[4:5] as first data DQ[1] in synchronization with the zeroth command/address clock signal CA_CLK0.

The third XOR operator XORc3 receives sixth and seventh command/address data C/A_D[6:7] and provides an XOR operation result for the sixth and seventh command/address data C/A_D[6:7] to the third latch Lc3. The third latch Lc3 outputs the XOR operation result for the sixth and seventh command/address data C/A_D[6:7] as the first data DQ[1] in synchronization with the first command/address clock signal CA_CLK1.

The fourth XOR operator XORc4 receives eighth and ninth command/address data C/A_D[8:9] and provides an XOR operation result for the eighth and ninth command/address data C/A_D[8:9] to the fourth latch Lc4. The fourth latch Lc4 outputs the XOR operation result for the eighth and ninth command/address data C/A_D[8:9] as second data DQ[2] in synchronization with the zeroth command/address clock signal CA_CLK0.

The fifth XOR operator XORc5 receives tenth and eleventh command/address data C/A_D[10:11] and provides an XOR operation result for the tenth and eleventh command/address data C/A_D[10:11] to the fifth latch Lc5. The fifth latch Lc5 outputs the XOR operation result for the tenth and eleventh command/address data C/A_D[10:11] as the second data DQ[2] in synchronization with the first command/address clock signal CA_CLK1.

The sixth XOR operator XORc6 receives twelfth and thirteenth command/address data C/A_D[12:13] and provides an XOR operation result for the twelfth and thirteenth command/address data C/A_D[12:13] to the sixth latch Lc6. The sixth latch Lc6 outputs the XOR operation result for the twelfth and thirteenth command/address data C/A_D[12:13] as third data DQ[3] in synchronization with the zeroth command/address clock signal CA_CLK0.

FIG. 17 shows mapping relationships between command/address clock signals CA_CLK and zeroth to thirteenth command/address data C/A_D[0:13] output as data DQ. The command/address clock signal CA_CLK corresponds to the command/address clock signal CA_CLK of FIG. 8.

Referring to FIG. 17, from the command/address training MUX 320c, the XOR operation result for the zeroth and first command/address data C/A_D[0:1] is output to a zeroth data pin 202_0, the XOR operation result for the fourth and fifth command/address data C/A_D[4:5] is output to a first data pin 202_1, the XOR operation result for the eighth and ninth command/address data C/A_D[8:9] is output to a second data pin 202_2, and the XOR operation result for the twelfth and thirteenth command/address data C/A_D[12:13] is output to a third data pin 202_3 in synchronization with the zeroth command/address clock signal CA_CLK0.

Also, in synchronization with the first command/address clock signal CA_CLK1, the XOR operation result for the second and third command/address data C/A_D[2:3] is output to the zeroth data pin 202_0, the XOR operation result for the sixth and seventh command/address data C/A_D[6:7] is output to the first data pin 202_1, the XOR operation result for the tenth and eleventh command/address data C/A_D[10:11] is output to the second data pin 202_2, and training result data T_Result is output to the third data pin 202_3.

During the training operation, the remaining fourth to fifteenth data pins 202_4 to 202_15 are turned off and do not perform an output operation, and the fourth to fifteenth data DQ[4:15] output from the fourth to fifteenth data pins 202_4 to 202_15 are invalid.

Figure 18:
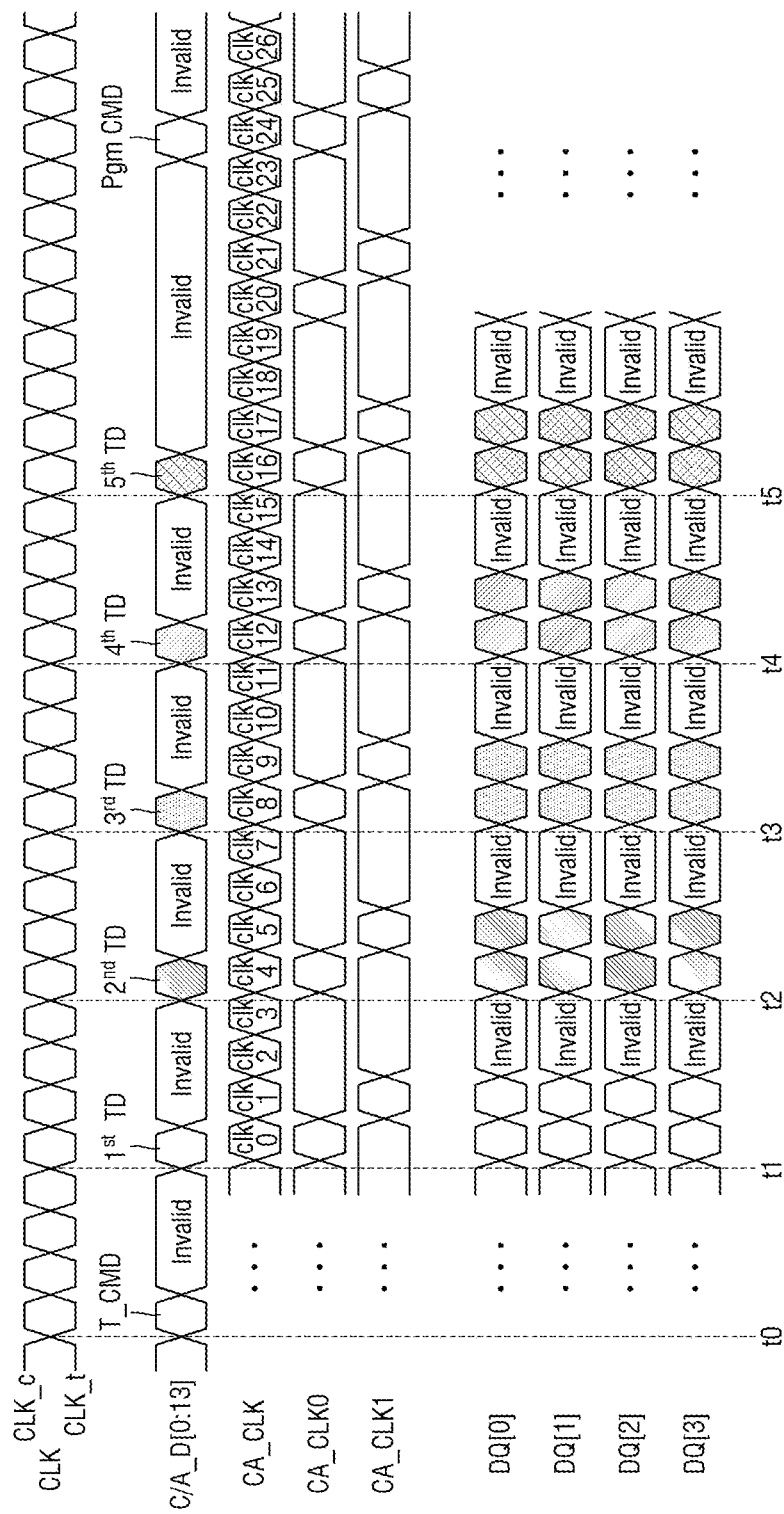
FIG. 18 is a timing diagram illustrating the operation of a memory system including the command/address training MUX of FIG. 16.
Figure 19:
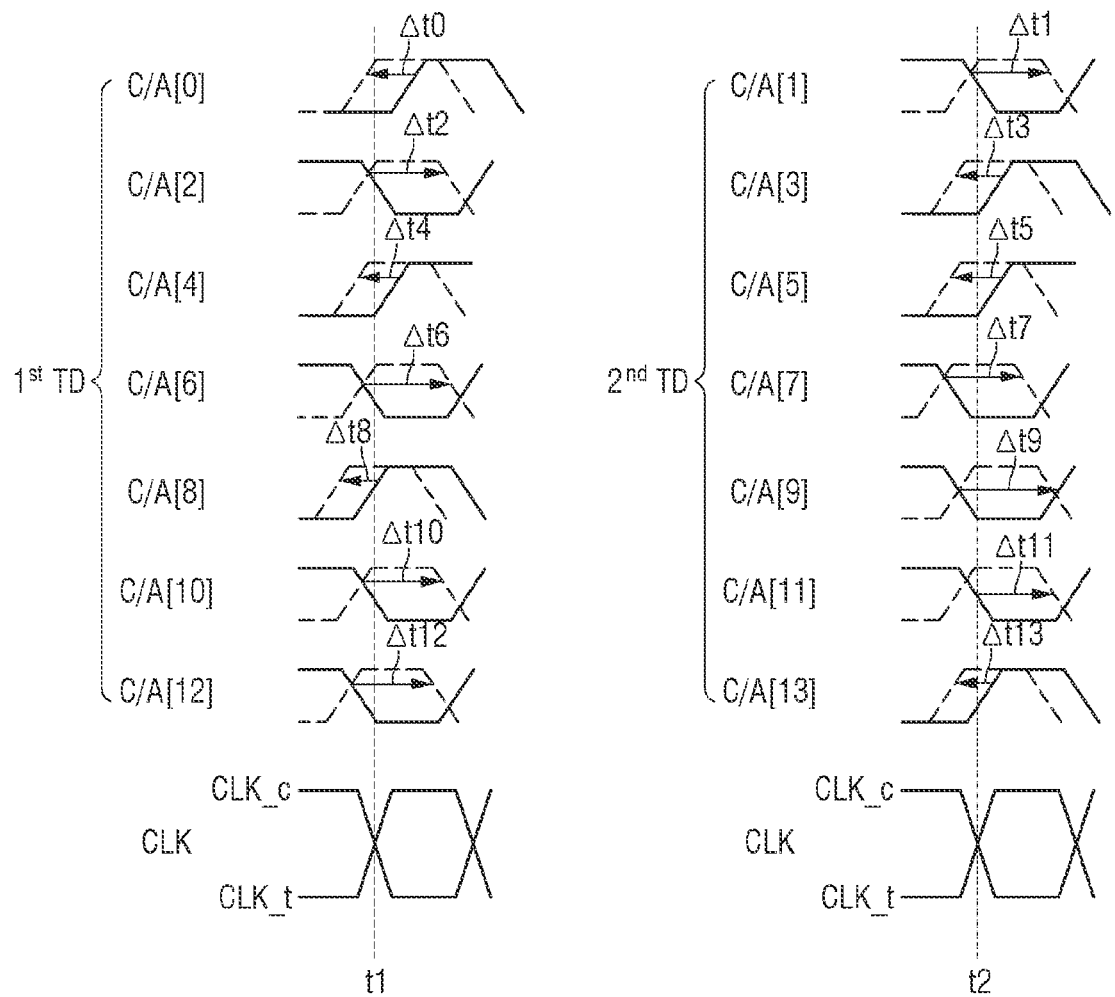
FIG. 19 is a diagram illustrating training data of FIG. 18.

FIG. 18 is a timing diagram illustrating the operation of a memory system including the command/address training MUX of FIG. 16. FIG. 19 is a diagram illustrating training data of FIG. 18. FIG. 20 is a diagram illustrating outputs of command/address data of FIG. 18.

Referring to FIGS. 18 to 20, a plurality of command/address flip-flops 310 sample zeroth to thirteenth command/address signals C/A[0:13] corresponding to a training command T_CMD at a zeroth time t0 in synchronization with a clock signal CLK and output the zeroth to thirteenth command/address data C/A_D[0:13] corresponding to the training command T_CMD as zeroth to third data DQ[0:3].

In the memory system including the command/address training MUX 320c, a memory controller 100 performs a timing adjustment training on some of the zeroth to thirteenth command/address signals C/A[0:13] included in first training data $1^{st}$ TD.

The memory controller 100 performs timing adjustments Δt0, Δt2, Δt4, Δt6, Δt8, Δt10, and Δt12 on the zeroth command/address signal C/A[0], the second command/address signal C/A[2], the fourth command/address signal C/A[4], the sixth command/address signal C/A[6], the eighth command/address signal C/A[8], the tenth command/address signal C/A[10], and the twelfth command/address signal C/A[12] on the basis of a first time t1. The memory controller 100 performs a timing adjustment on only the zeroth command/address signal C/A[0], the second command/address signal C/A[2], the fourth command/address signal C/A[4], the sixth command/address signal C/A[6], the eighth command/address signal C/A[8], the tenth command/address signal C/A[10], and the twelfth command/address signal C/A[12] and determines whether the training operation for the zeroth command/address signal C/A[0], the second command/address signal C/A[2], the fourth command/address signal C/A[4], the sixth command/address signal C/A[6], the eighth command/address signal C/A[8], the tenth command/address signal C/A[10], and the twelfth command/address signal C/A[12] has been finished through an XOR operation result.

The memory controller 100 performs timing adjustments Δt1, Δt3, Δt5, Δt7, Δt9, Δt11, and Δt13 on a first command/address signal C/A[1], a third command/address signal C/A[3], a fifth command/address signal C/A[5], a seventh command/address signal C/A[7], a ninth command/address signal C/A[9], an eleventh command/address signal C/A[11], and a thirteenth command/address signal C/A[13] among zeroth to thirteenth command/address signals C/A[0:13] included in second training data $2^{nd}$ TD on the basis of a second time t2 subsequent to the first time t1.

Referring to FIG. 20, the command/address training MUX 320c respectively outputs an XOR operation result value of the zeroth and first command/address data C/A_D[0:1], an XOR operation result value of the fourth and fifth command/address data C/A_D[4:5], an XOR operation result value of the eighth and ninth command/address data C/A_D[8:9], and an XOR operation result value of the twelfth and thirteenth command/address data C/A_D[12:13] included in the first training data $1^{st}$ TD to the zeroth to third data pins 202_0 to 202_3 as the zeroth to third data DQ[0:3] in synchronization with the zeroth clock signal clk0 and provides the outputs to the memory controller 100.

The command/address training MUX 320c respectively outputs an XOR operation result value of the second and third command/address data C/A_D[2:3], an XOR operation result value of the sixth and seventh command/address data C/A_D[6:7], an XOR operation result value of the tenth and eleventh command/address data C/A_D[10:11], and training result data T_Result, which represents a "fail," included in the first training data $1^{st}$ TD to the zeroth to third data pins 202_0 to 202_3 as the zeroth to third data DQ[0:3] in synchronization with the first clock signal clk1 and provides the outputs to the memory controller 100.

Subsequently, the same output operation is performed for second to fifth training data $2^{nd}$ TD to $5^{th}$ TD, and the training operation is completed through training result data of a "pass" obtained by synchronizing the fifth training data $5^{th}$ TD with a seventeenth clock signal clk17.

Compared with the command/address training MUX 320a of FIG. 4, the command/address training MUX 320c includes the XOR operators and thus can output training information of zeroth to thirteenth command/address signals C/A[0:13] in synchronization with two-cycle clock signals. In addition, the command/address training MUX 320c may reduce the period of timing adjustment for the zeroth to thirteenth command/address signals C/A[0:13] to two cycles.

Although exemplary embodiments of the present disclosure have been described above with reference to the accompanying drawings, the present disclosure is not limited to these embodiments and may be implemented in various different forms. Those of ordinary skill in the art should appreciate that the present disclosure can be implemented in other detailed forms without significantly deviating from the technical spirit of the present disclosure. Therefore, it is to be understood that the above-described exemplary embodiments are exemplary in all aspects and are not limiting.

What is claimed is:

1. A memory system comprising:
a memory controller configured to control an operation of a memory cell array through a first command/address pin and a second command/address pin different from the first command/address pin; and
a memory device including a plurality of data pins configured to exchange data input with the memory cell array according to a command/address provided through the first and second command/address pins by the memory controller, a first flip-flop configured to sample a first command/address signal provided to an input of the first flip-flop from the first command/address pin as first command/address data at a first time, and a second flip-flop configured to sample a second command/address signal provided to an input of the second flip-flop from the second command/address pin as second command/address data at the first time,
wherein the memory device provides the first and second command/address data to the memory controller through a single data pin among the plurality of data pins,
wherein the memory controller performs training on the first and second command/address data received through the single data pin to indicate whether a clock signal is in sync with a data signal provided by the memory controller,
wherein the first flip-flop is directly connected to the first command/address pin, and
wherein the second flip-flop is directly connected to the second command/address pin.

2. The memory system of claim 1, wherein the memory controller provides a third command/address signal to the memory device through a third command/address pin different from the first and second command/address pins, and performs training on the third command/address signal based on a second time different from the first time, and the memory device receives the trained third command/address signal and provides third command/address data corresponding to the third command/address signal to the memory controller through the first data pin.

3. The memory system of claim 1, wherein the memory device further includes an XOR operator configured to receive the first and second command/address signals, perform an XOR operation on the first and second command/ address signals, and output a result value of the XOR operation through the first data pin.

4. The memory system of claim 1, wherein, while the first and second command/address data are output through the first data pin, an output operation of a second data pin different from the first data pin, among the plurality of data pins is not performed.

5. The memory system of claim 1, wherein the memory controller provides a clock signal to the memory device, and the memory device further includes:
   a clock generator configured to generate a command/address clock signal consecutively including a first clock signal, a second clock signal, a third clock signal, and a fourth clock signals based on the clock signal; and
   a first latch configured to output the first command/address data to the first data pin in response to one of the first to fourth clock signals.

6. The memory system of claim 5, wherein the clock generator generates a first command/address clock signal including the first clock signal without including the second to fourth clock signals, and a second command/address clock signal including the second clock signal without including the first, third, and fourth clock signals, the first latch outputs the first command/address data to the first data pin in response to the first command/address clock signal, and the memory device further includes a second latch configured to output the second command/address data to the first data pin in response to the second command/address clock signal.

7. The memory system of claim 5, wherein the memory device provides training result data indicating whether the clock signal is in sync with the data signal provided by the memory controller, to the memory controller through the first data pin in response to at least one of the first to fourth clock signals.

8. The memory system of claim 7, wherein, when the training result data indicates the clock signal is in sync with the data signal when the memory device performs an input or output operation on the memory cell array.

9. The memory system of claim 7, wherein, when the training result data indicates the clock signal is not in sync with the data signal, the memory controller provides a third command/address signal and a fourth command/address signal to the memory device through the first and second command/address pins, respectively, the first flip-flop samples the third command/address signal as third command/address data at a third time subsequent to the first time, the second flip-flop samples the fourth command/address signal as fourth command/address data at the third time, and the memory device provides the third and fourth command/address data to the memory controller through the first data pin.

10. A memory system comprising:
   a memory controller configured to control an operation of a memory cell array by providing a command/address through a first command/address pin and a second command/address pin different from the first command/address pin, perform transmitting of a first command/address signal through the first command/address pin, and perform transmitting of a second command/address signal through the second command/address pin; and
   a memory device configured to receive the first and second command/address signals and include a plurality of data pins which output first command/address data and second command/address data respectively corresponding to the first and second command/address signals,
   wherein the memory device outputs the first and second command/address data through a single data pin among the plurality of data pins,
   wherein the memory device further includes:
      a first flip-flop configured to generate the first command/address data by sampling the first command/address signal provided to an input of the first flip-flop from the first command/address pin at a first time; and
      a second flip-flop configured to generate the second command/address data by sampling the second command/address signal provided to an input of the second flip-flop from the second command/address pin at the first time,
   wherein the memory controller performs training on the first and second command/address data received through the single data pin to indicate whether a clock signal is in sync with a data signal provided by the memory controller,
   wherein the first flip-flop is directly connected to the first command/address pin, and
   wherein the second flip-flop is directly connected to the second command/address pin.

11. The memory system of claim 10, wherein, while the first and second command/address data are output through the first data pin, an output operation of a second data pin different from the first data pin, among the plurality of data pins is not performed.

12. The memory system of claim 10, wherein the memory controller provides the clock signal to the memory device, and the memory device further includes:
   a clock generator configured to generate a command/address clock signal consecutively including a first clock signal, a second clock signal, a third clock signal, and a fourth clock signal based on the clock signal; and
   a first latch configured to output the first command/address data to the first data pin in response to at least one of the first to fourth clock signals.

13. The memory system of claim 12, wherein the clock generator generates a first command/address clock signal including the first clock signal, and a second command/address clock signal including the second clock signal, the first latch outputs the first command/address data to the first data pin in response to the first command/address clock signal, and the memory device further includes a second latch configured to output the second command/address data to the first data pin in response to the second command/address clock signal.

14. The memory system of claim 10, wherein the memory controller provides a third command/address signal to the memory device through a third command/address pin different from the first and second command/address pins, and performs training on the third command/address signal based on a second time different from the first time, and the memory device receives the trained third command/address signal and provides third command/address data corresponding to the third command/address signal to the memory controller through the first data pin.

15. An electronic system comprising:
   a host configured to provide a command for requesting an input or output of data;
   a memory controller configured to control an operation of a memory cell array by providing a command/address through a first command/address pin and a second command/address pin different from the first command/address pin; and a memory device including a plurality of data pins configured to provide the data of the memory cell array input or output through the command/address to the memory controller, wherein the memory device further includes:
- a first flip-flop configured to sample a first command/address signal provided to an input of the first flip-flop from the first command/address pin, as first command/address data at a first time; and
- a second flip-flop configured to sample a second command/address signal provided to an input of the second flip-flop from the second first command/address pin, as second command/address data at the first time, and wherein the first and second command/address data is provided to the memory controller through a single data pin among the plurality of data pins, wherein the memory controller performs training on the first and second command/address data received through the single data pin to indicate whether a clock signal is in sync with a data signal provided by the memory controller, wherein the first flip-flop is directly connected to the first command/address pin, and wherein the second flip-flop is directly connected to the second command/address pin.

16. The electronic system of claim 15, wherein the memory controller provides the first and second command/address signals to the memory device between an operation of receiving the command/address and an operation of inputting or outputting the data.

17. The electronic system of claim 15, wherein the memory controller performs the training on the first and second command/address signals based on the first time.

18. The electronic system of claim 15, wherein, while the first and second command/address data are output through the first data pin, an output operation of a second data pin different from the first data pin, among the plurality of data pins is not performed.

* * * * *